United States Patent
Xu et al.

(10) Patent No.: US 11,244,134 B2
(45) Date of Patent: Feb. 8, 2022

(54) DISPLAY PANEL AND DISPLAY DEVICE

(71) Applicant: Xiamen Tianma Micro-Electronics Co., Ltd., Xiamen (CN)

(72) Inventors: Xiai Xu, Xiamen (CN); Xiaoxiao Wu, Xiamen (CN); Bozhi Liu, Xiamen (CN); Min Huang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/868,416

(22) Filed: May 6, 2020

(65) Prior Publication Data
US 2021/0200980 A1    Jul. 1, 2021

(51) Int. Cl.
*G06K 9/00* (2006.01)
*G09G 3/20* (2006.01)

(52) U.S. Cl.
CPC ....... *G06K 9/00013* (2013.01); *G09G 3/2096* (2013.01); *G09G 2310/0267* (2013.01); *G09G 2310/0286* (2013.01); *G09G 2310/062* (2013.01)

(58) Field of Classification Search
CPC ............. G06K 9/00013; G09G 3/2096; G09G 2310/062; G09G 2310/0267; G09G 2310/0286
See application file for complete search history.

(56) References Cited

U.S. PATENT DOCUMENTS

| | | | | |
|---|---|---|---|---|
| 10,095,910 | B2 * | 10/2018 | He | G06F 3/0443 |
| 10,437,974 | B2 * | 10/2019 | He | G06K 9/2027 |
| 2013/0050157 | A1 * | 2/2013 | Baek | G09G 3/2022 |
| | | | | 345/204 |
| 2015/0049041 | A1 * | 2/2015 | Yousefpor | G06F 3/0416 |
| | | | | 345/174 |

(Continued)

FOREIGN PATENT DOCUMENTS

| | | | |
|---|---|---|---|
| CN | 107479766 A | 12/2017 | |
| CN | 108806603 A | 11/2018 | |

(Continued)

*Primary Examiner* — Amy Onyekaba
(74) *Attorney, Agent, or Firm* — Alston & Bird LLP

(57) ABSTRACT

Provided are a display panel and display device. The display panel includes a display region and a border region. The border region is provided with a display cascade scanning circuit and a fingerprint-identification cascade scanning circuit. The display region is provided with multiple display scanning lines and multiple fingerprint scanning lines. The display cascade scanning circuit is electrically connected to the multiple display scanning lines and configured to output display scanning signals to the multiple display scanning lines respectively. The fingerprint-identification cascade scanning circuit is electrically connected to the multiple fingerprint scanning lines and configured to generate and output fingerprint scanning signals to the multiple fingerprint scanning lines respectively. The fingerprint-identification cascade scanning circuit includes a first fingerprint-identification cascade scanning circuit and a second (Continued)

fingerprint-identification cascade scanning circuit that are disposed at two opposite sides of the display region.

17 Claims, 18 Drawing Sheets

(56) References Cited

U.S. PATENT DOCUMENTS

| | | | |
|---|---|---|---|
| 2015/0219945 A1* | 8/2015 | Kimura | G09G 3/36 349/152 |
| 2016/0034742 A1* | 2/2016 | Kim | H04B 1/385 382/124 |
| 2016/0132713 A1* | 5/2016 | Bae | G06K 9/0014 345/174 |
| 2016/0190522 A1* | 6/2016 | Lee | H01L 51/0097 257/40 |
| 2016/0224178 A1* | 8/2016 | Yang | G06K 9/00013 |
| 2016/0266695 A1* | 9/2016 | Bae | G06F 3/04166 |
| 2016/0328037 A1* | 11/2016 | Zhuang | G06F 3/041 |
| 2017/0116453 A1* | 4/2017 | Ganapathi | G06K 9/0004 |
| 2017/0242311 A1* | 8/2017 | Li | G02F 1/13306 |
| 2017/0344779 A1* | 11/2017 | Yoon | G06K 9/0002 |
| 2017/0351364 A1* | 12/2017 | Kim | G06K 9/001 |
| 2017/0364187 A1* | 12/2017 | Zhai | G02F 1/13338 |
| 2017/0371213 A1* | 12/2017 | Wang | G02F 1/136286 |
| 2017/0372113 A1* | 12/2017 | Zhang | G06K 9/2036 |
| 2018/0005007 A1* | 1/2018 | Du | G06K 9/2036 |
| 2018/0025203 A1* | 1/2018 | Lee | G06F 3/0443 382/124 |
| 2018/0121153 A1* | 5/2018 | Lee | G09G 3/003 |
| 2018/0129852 A1* | 5/2018 | Zeng | H01L 27/3253 |
| 2018/0137805 A1* | 5/2018 | Zheng | G11C 19/28 |
| 2018/0158877 A1* | 6/2018 | Zeng | G06K 9/0004 |
| 2018/0190190 A1* | 7/2018 | Xi | G09G 3/3225 |
| 2018/0211080 A1* | 7/2018 | He | G06K 9/00087 |
| 2018/0307887 A1* | 10/2018 | Han | H01L 21/70 |
| 2018/0342052 A1* | 11/2018 | Higuchi | G06T 7/0002 |
| 2019/0012518 A1* | 1/2019 | Yang | G06F 3/0443 |
| 2019/0034020 A1* | 1/2019 | He | G06K 9/00033 |
| 2019/0050094 A1* | 2/2019 | Zeng | G06F 3/0412 |
| 2019/0065811 A1* | 2/2019 | Cao | G06K 9/0004 |
| 2019/0073509 A1* | 3/2019 | Chien | G02F 1/133553 |
| 2019/0080133 A1* | 3/2019 | Zhang | G06K 9/0002 |
| 2019/0188444 A1* | 6/2019 | Yang | G06K 9/00013 |
| 2019/0205591 A1* | 7/2019 | Ban | G06K 9/0002 |
| 2019/0266379 A1* | 8/2019 | Huang | H01L 27/32 |
| 2019/0267434 A1* | 8/2019 | Liu | G06F 1/1637 |
| 2019/0347987 A1* | 11/2019 | Zhao | G09G 3/3225 |
| 2019/0370523 A1* | 12/2019 | Gao | G09G 3/3266 |
| 2019/0377446 A1* | 12/2019 | Lin | G06K 9/00013 |
| 2019/0377924 A1* | 12/2019 | Shen | G06K 9/209 |
| 2020/0005701 A1* | 1/2020 | Chen | G09G 3/2092 |
| 2020/0005706 A1* | 1/2020 | Li | G06K 9/0004 |
| 2020/0042762 A1* | 2/2020 | Fu | G02B 27/4233 |
| 2020/0097700 A1* | 3/2020 | Lin | G06K 9/0002 |
| 2020/0273401 A1* | 8/2020 | Lee | G09G 3/3233 |
| 2020/0320269 A1* | 10/2020 | Kim | G06F 3/0416 |
| 2020/0364439 A1* | 11/2020 | Hu | G06F 3/044 |
| 2021/0034835 A1* | 2/2021 | Cheng | G06K 9/00013 |
| 2021/0064844 A1* | 3/2021 | Xie | G06F 3/3231 |

FOREIGN PATENT DOCUMENTS

| | | | |
|---|---|---|---|
| CN | 108877621 A | * | 11/2018 |
| CN | 110008883 A | * | 7/2019 |
| CN | 110008883 A | | 7/2019 |
| CN | 110097038 A | | 8/2019 |
| CN | 110728265 A | | 1/2020 |
| CN | 110909661 A | | 3/2020 |

* cited by examiner

DISPLAY PANEL AND DISPLAY DEVICE

CROSS-REFERENCES TO RELATED APPLICATIONS

This application claims the priority to a Chinese patent application No. CN 201911207419.3 filed at the CNIPA on Nov. 29, 2019, disclosure of which is incorporated herein by reference in its entirety.

TECHNICAL FIELD

The present disclosure relates to display technologies and, in particular, to a display panel and a display device.

BACKGROUND

With the development of display technologies, a display screen with a high screen-to-body ratio and a narrow bezel has become more popular for good user experience. The screen-to-body ratio refers to the ratio of the screen area to the whole body footprint. High screen-to-body ratio brings better visual effect and user experience.

Fingerprint is an inherent and unique individual human biological feature. There are more electronic devices having a fingerprint identification function. For example, in a mobile phone, fingerprint identification may be applied to various scenarios such as unlocking devices and electronic payment. To increase the screen-to-body ratio and include the fingerprint identification function, solutions of optical fingerprint identification embedded in the screen attract more attention. According to existing optical fingerprint identification solutions, the fingerprint identification is generally implemented by using a drive circuit having three transistors and one photodiode (3T1D) or a drive circuit having four transistors and one photodiode (4T1D). The 3T1D drive circuit requires two drive signal wires and one reading signal wire. The 4T1D drive circuit requires three drive signal wires and one reading signal wire. If each signal wire is attached with an integrated circuit (IC) chip, the total size of the required IC chips will exceed the allowed maximum size of the IC chip design even if the fingerprint identification region is larger (for example, the fingerprint identification region occupies twenty-five percent of the total area of the display region). This is not conducive to the wire design and is not feasible.

SUMMARY

Embodiments of the present disclosure provide a display panel and a display device. The display panel is provided with an embedded fingerprint identification region. A fingerprint-identification cascade scanning circuit is disposed in a border region to provide scanning drive signals for a fingerprint identification circuit. This helps reduce the number of signal wires connected to an integrated circuit chip, thereby ensuring that the size of the integrated circuit chip meets the design requirements.

In a first aspect, an embodiment of the present disclosure provides a display panel. The display panel includes a display region and a border region surrounding the display region. A display cascade scanning circuit and a fingerprint-identification cascade scanning circuit are disposed in the border region.

The display region is provided with multiple display scanning lines and multiple fingerprint scanning lines.

The display cascade scanning circuit is electrically connected to each of the multiple display scanning lines respectively, where the display cascade scanning circuit generates display scanning signals, and is configured to output the display scanning signals to the multiple display scanning lines respectively.

The fingerprint-identification cascade scanning circuit is electrically connected to the multiple fingerprint scanning lines respectively, wherein the fingerprint-identification cascade scanning circuit generates fingerprint-identification scanning signals, and is configured to output the fingerprint scanning signals to the multiple fingerprint scanning lines.

The fingerprint-identification cascade scanning circuit includes a first fingerprint-identification cascade scanning circuit and a second fingerprint-identification cascade scanning circuit. The first fingerprint-identification cascade scanning circuit and the second fingerprint-identification cascade scanning circuit are located in the border region at two opposite sides of the display region.

In a second aspect, an embodiment of the present disclosure further provides a display device. The display device includes the preceding display panel.

The display panel provided in the embodiment of the present disclosure includes the display region and the border region surrounding the display region. The display cascade scanning circuit and the fingerprint-identification cascade scanning circuit are disposed in the border region. The display region is provided with multiple display scanning lines and multiple fingerprint scanning lines. The display cascade scanning circuit is electrically connected to each of the multiple display scanning lines respectively, the display cascade scanning circuit generates display scanning signals, and is configured to output the display scanning signals to the multiple display scanning lines so that the scanning process of pixel units is implemented. The fingerprint-identification cascade scanning circuit is electrically connected to each of the multiple fingerprint scanning lines respectively, where the fingerprint-identification cascade scanning circuit generates fingerprint-identification scanning signals, and is configured to output the fingerprint scanning signals to the multiple fingerprint scanning lines so that the scanning process of fingerprint-identification units is implemented. The fingerprint-identification cascade scanning circuit includes a first fingerprint-identification cascade scanning circuit and a second fingerprint-identification cascade scanning circuit. The first fingerprint-identification cascade scanning circuit and the second fingerprint-identification cascade scanning circuit are disposed in the border region and located at two opposite sides of the display region. The fingerprint-identification cascade scanning circuit is disposed to provide scanning drive signals for a fingerprint identification circuit via multiple cascade output terminals, thereby avoiding too many scanning drive signal lines and reducing the size of the integrated circuit chip. The first fingerprint-identification cascade scanning circuit and the second fingerprint-identification cascade scanning circuit are disposed in the border region at two opposite sides of the display region, and this is beneficial to the wiring in the border region and helps reduce the bezel width.

DETAILED DESCRIPTION

Figure 1:
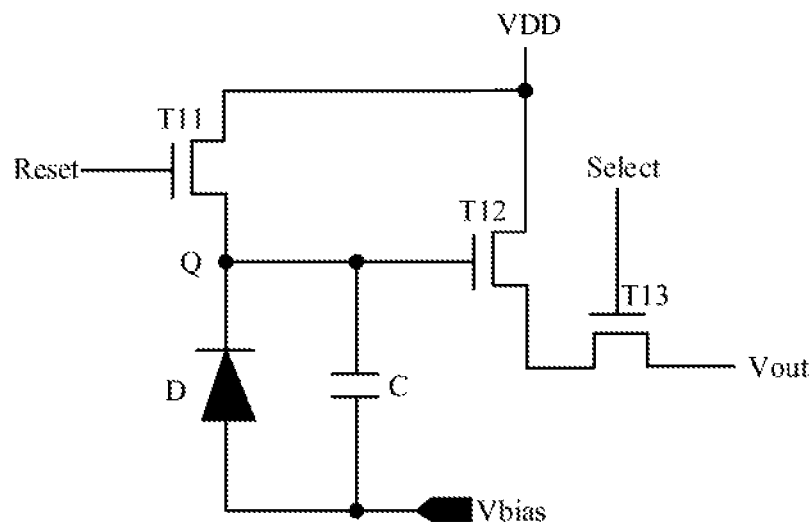
FIG. 1 is a schematic circuit block diagram of a 3T1D fingerprint identification circuit.

Hereinafter the present disclosure will be further described in detail in conjunction with the drawings and embodiments. It is to be understood that the embodiments set forth herein are merely intended to illustrate and not to limit the present disclosure. Additionally, it is to be noted that for ease of description, merely part, not all, of the structures related to the present disclosure are illustrated in the drawings.

Terms used in the embodiments of the present disclosure are merely used to describe specific embodiments and not intended to limit the present disclosure. It is to be noted that nouns of locality, including "on", "below", "left" and "right", used in the embodiments of the present disclosure are described from the angles shown in the drawings, and are not to be construed as a limitation to embodiments of the present disclosure. Additionally, in the context, it is to be understood that when an element is formed "on" or "below" another element, the element may not only be directly formed "on" or "below" another element, and may be indirectly formed "on" or "below" another element via an intermediate element. The terms "first", "second" and the like are only used for description and used to distinguish between different components rather than indicate any order, quantity, or importance. For those of ordinary skill in the art, the preceding terms can be construed according to specific circumstances in the present disclosure.

At present, a fingerprint identification element and a fingerprint identification circuit are integrated into a display panel. The fingerprint identification circuit can drive the corresponding fingerprint identification element to perform fingerprint identification, thus helping implement full-screen fingerprint identification of the display panel. FIG. 1 is a circuit diagram of a 3T1D fingerprint identification circuit. Referring to FIG. 1, the fingerprint identification circuit includes a first thin film transistor T11, a second thin film transistor T12, a third thin film transistor T13, a capacitor C and a photodiode D. A control terminal of the first thin film transistor T11 is electrically connected to a reset control scanning line Reset. A first terminal of the first thin film transistor T11 is electrically connected to a voltage signal line VDD. A second terminal of the first thin film transistor T11 is electrically connected to a cathode of the photodiode D. A anode of the photodiode D is electrically connected to a common voltage signal line Vbias. The capacitor C and the photodiode D are connected in parallel. A control terminal of the second thin film transistor T12 is electrically connected to a second terminal of the first thin film transistor T11. A first terminal of the second thin film transistor T12 is electrically connected to the voltage signal line VDD. A second terminal of the second thin film transistor T12 is electrically connected to a first terminal of the third thin film transistor T13. A control terminal of the third thin film transistor T13 is electrically connected to an output control scanning line Select. A second terminal of the third thin film transistor T13 is electrically connected to an output signal line Vout. Accordingly, the fingerprint identification process corresponding to the fingerprint identification circuit sequentially includes a reset stage, a first reading stage and a second reading stage. An integration stage is spaced between the first reading stage and the second reading stage.

Figure 2:
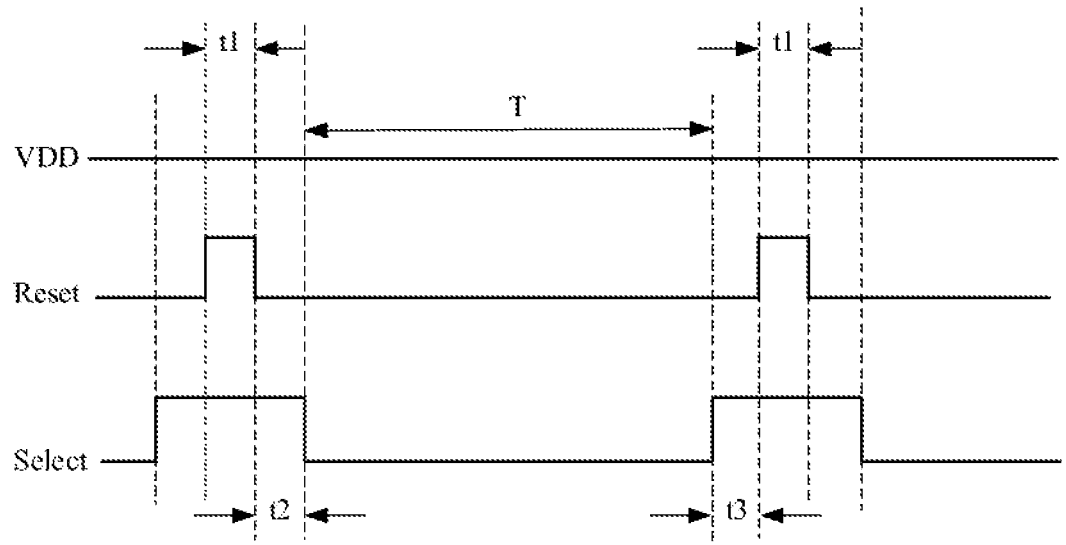
FIG. 2 is a timing graph of the 3T1D fingerprint identification circuit shown in FIG. 1.

For example, FIG. 2 is a timing graph of the 3T1D fingerprint identification circuit shown in FIG. 1. Referring to FIG. 2, the operation process of the fingerprint identification circuit is as follows. At the reset stage t1, the reset control scanning line Reset provides a logic high-level to control the first thin film transistor T11 to turn on, and the voltage of the voltage signal line VDD is transmitted to a node Q via the first thin film transistor T11 to reset the potential of the node Q. At the first reading stage t2, the integration stage T and the second reading stage t3, the first thin film transistor T11 is turned off, the photodiode D generates a leakage current due to illumination, the capacitor C discharges, the potential of the node Q gradually decreases, the second thin film transistor T12 operates in the linear range, and the leakage current of the second thin film transistor T12 is proportional to the potential of the node Q. In the first reading stage t2, the third thin film transistor T13 is controlled to turn on, the voltage of the voltage signal line VDD is transmitted to the output signal line Vout via the second thin film transistor T2 and the third thin film transistor T13. The conduction degree of the second thin film transistor T12 determines the potential of the output signal line Vout and depends on the voltage of the node Q. That is, the potential of the node Q determines the potential of the output signal line Vout. Voltage V1 is read on the output signal line Vout at the first reading stage t2, voltage value V2 is read on the output signal line Vout at the second reading stage t3, and then V1-V2 depends the magnitude of the leakage current of the photodiode D. The magnitude of the leakage current of the photodiode D depends on the light intensity the photodiode D receives, so different light intensities results in different values of V2. During fingerprint detection, the light intensity reflected to the photodiode D is different in different fingerprint region, so it is feasible to detect V1-V2 corresponding to light sensing units at various positions in the fingerprint identification region to implement fingerprint identification.

The fingerprint identification circuit described above requires two scanning drive wires (the reset control scanning line Reset and the output control scanning line Select) and one reading signal wire (the output signal line Vout). An example in which a pixel unit is provided with one fingerprint identification unit is described as follows. For a full high definition (FHD, 2340×1080 resolution) mobile phone screen having a length-width ratio of 19.5:9, 2250 wires (1080 output signal lines, 585 reset control scanning lines and 585 output control scanning lines) are required when the fingerprint identification region occupies twenty five percent of the total area of display region. If these 2250 wires are each connected to an IC chip, the size of the IC chip should be designed to be 40.5 mm according to the existing design, while the existing IC chip integrated in the mobile phone has a maximum size of 32 mm. The designed IC chip exceeds the maximum size of the IC chip and is not conducive to the wiring design in a border region. When the fingerprint identification circuit is designed for a 4T1D circuit, more scanning signal lines are required, thus it is difficult for the existing design to meet the requirements.

In view of this, this embodiment of the present disclosure provides a display panel. The display panel includes a display region and a border region surrounding the display region. The border region is provided with a display cascade scanning circuit and a fingerprint-identification cascade scanning circuit. The display region is provided with multiple display scanning lines and multiple fingerprint scanning lines. The display cascade scanning circuit is electrically connected to the multiple display scanning lines and configured to output display scanning signals to the multiple display scanning lines. The fingerprint-identification cascade scanning circuit is electrically connected to the multiple fingerprint scanning lines and configured to output fingerprint scanning signals to the multiple fingerprint scanning lines. The fingerprint-identification cascade scanning circuit includes a first fingerprint-identification cascade scanning circuit and a second fingerprint-identification cascade scanning circuit. The first fingerprint-identification cascade scanning circuit and the second fingerprint-identification cascade scanning circuit are disposed in the border region and located at two opposite sides of the display region.

According to the technical solution of this embodiment of the present disclosure, the fingerprint-identification cascade scanning circuit is disposed to provide scanning drive signals for the fingerprint identification circuit via multiple cascade output terminals, thereby avoiding too many scanning drive signal lines and reducing the size of the integrated circuit chip. The first fingerprint-identification cascade scanning circuit and the second fingerprint-identification cascade scanning circuit are disposed in the border region at two opposite sides of the display region, and this is beneficial to the wiring in the border region and helps reduce the bezel width.

The above is the core idea of the present disclosure, and technical solutions in the embodiments of the present disclosure will be described clearly and completely in conjunction with drawings in the embodiments of the present disclosure. On the basis of the embodiments of the present disclosure, all other embodiments obtained by those skilled in the art without creative work are within the scope of the embodiments of the present disclosure.

Figure 3:
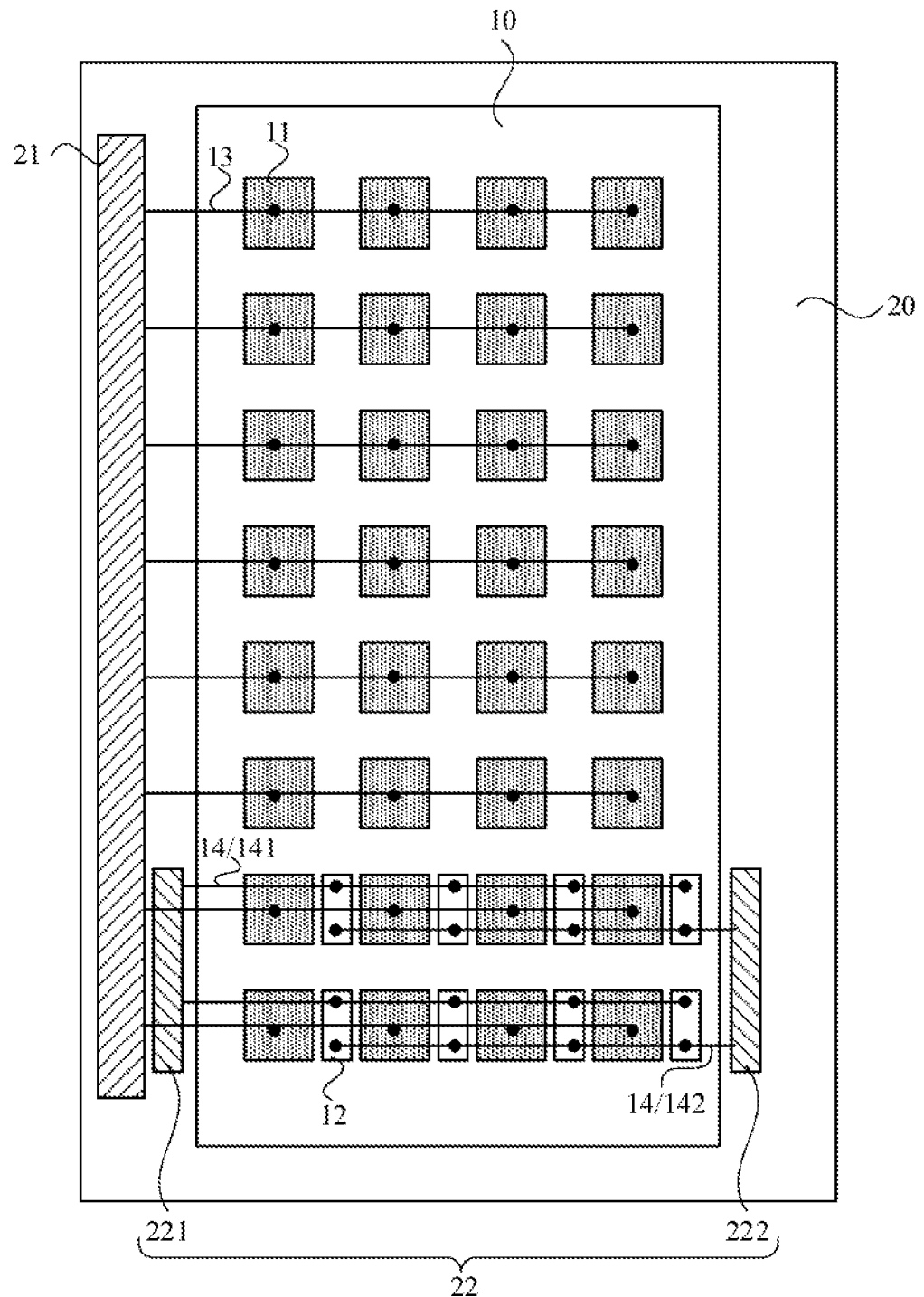
FIG. 3 is a structural diagram of a display panel according to an embodiment of the present disclosure.

FIG. 3 is a structural diagram of a display panel according to an embodiment of the present disclosure. Referring to FIG. 3, the display panel provided by this embodiment includes a display region 10 and a border region 20 surrounding the display region. The display region 10 is provided with multiple pixel units 11 arranged in an array. The multiple pixel units 11 are electrically connected to corresponding pixel drive circuits (not shown in FIG. 3). At least part of the display region 10 is provided with multiple fingerprint identification elements 12 arranged in an array (exemplary, the multiple fingerprint identification elements 12 occupies the lower quarter of the display region in FIG. 3). The multiple fingerprint identification elements 12 are electrically connected to corresponding fingerprint identification circuits (not shown in FIG. 3). The border region 20 is provided with a display cascade scanning circuit 21 and a fingerprint-identification cascade scanning circuit 22. The display region 10 is provided with multiple display scanning lines 13 and multiple fingerprint scanning lines 14. The display cascade scanning circuit 21 is electrically connected to the pixel drive circuits of the multiple pixel units 11 via the multiple display scanning lines 13 and is configured to output display scanning signals to the pixel drive circuits via the multiple display scanning lines 13. The fingerprint-identification cascade scanning circuit 22 is electrically connected to the fingerprint identification circuits of the multiple fingerprint identification elements 12 through the multiple fingerprint scanning lines 14 and is configured to output fingerprint scanning signals to the fingerprint identification circuits via the multiple fingerprint scanning lines 14. The fingerprint-identification cascade scanning circuit 22 includes a first fingerprint-identification cascade scanning circuit 221 and a second fingerprint-identification cascade scanning circuit 222. The first fingerprint-identification cascade scanning circuit 221 and the second fingerprint-identification cascade scanning circuit 222 are disposed in the border region 20 and located at two opposite sides of the display region 10.

It is to be understood that the display panel provided by this embodiment of the present disclosure may be a liquid crystal display panel or an organic light emitting display panel. The display region 10 is provided with the multiple pixel units 11 arranged in an array. The multiple fingerprint identification elements 12 may be disposed in gaps between the multiple pixel units 11 or integrated with the multiple pixel units 11. These are not limited in this embodiment of the present disclosure. Each fingerprint identification element 12 is connected to the fingerprint identification circuit, for example, the 3T1D circuit shown in FIG. 1.

Figure 4:
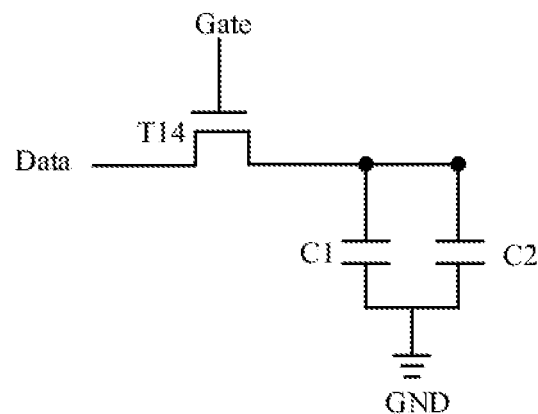
FIG. 4 is a schematic block diagram of a pixel drive circuit according to an embodiment of the present disclosure.

In the specific implementation, the operation process of the display panel may be divided into a display stage and a fingerprint identification stage. The display stage and the fingerprint identification stage may be performed independently or simultaneously. For example, FIG. 4 is a circuit diagram of a pixel drive circuit according to an embodiment of the present disclosure. Referring to FIG. 4, the pixel drive circuit includes a fourth thin film transistor T14, a first capacitor C1 and a second capacitor C2. A control terminal of the fourth thin film transistor T14 is electrically connected to a display scanning line Gate. A first terminal of the fourth thin film transistor T14 is electrically connected to a data signal line Data. A second terminal of the fourth thin film transistor T14 is electrically connected to a first terminal of the first capacitor C1. A second terminal of the first capacitor C1 is grounded. The second capacitor C2 and the first capacitor C1 are connected in parallel. At the display stage, the operation process of the pixel drive circuit is as follows. The display scanning line Gate provides a scanning signal to the pixel drive circuit to turn on the fourth thin film transistor T14. Meanwhile, the data signal line Data provides a display voltage to the pixel drive circuit to charge the first capacitor C1 and the second capacitor C2. In this way, even after the fourth thin film transistor T14 is turned off, display voltages stored in the first capacitor C1 and the second capacitor C2 can still ensure that a sub-pixel is in the illuminated state until each sub-pixel in the display region is illuminated. It is to be understood that the signal of the display scanning line Gate may from the display cascade scanning circuit, and the signal of the data signal line Data may from a display control chip.

At the fingerprint identification stage, each fingerprint identification element is configured to receive the reflected light reflected back by a touch body and output the signal via the fingerprint identification circuit to perform fingerprint identification. For the operation process of the 3T1D fingerprint identification circuit, refer to FIGS. 1 and 2 as examples. Scanning signals of the reset control scanning line Reset and the output control scanning line Select may be provided via the fingerprint identification cascade scanning circuit. The number of input terminals of the fingerprint-identification cascade scanning circuit is much less than the number of fingerprint scanning lines. The fingerprint-identification cascade scanning circuit may be provided with multiple output terminals, and each output terminal separately drives a row of fingerprint identification circuits. Such configuration prevents the multiple fingerprint scanning lines from being directly connected to the IC chip, and enables the IC chip to meet the design size requirements, thereby avoiding arranging the multiple fingerprint scanning lines along the border region and widening the border region, and being in line with design trend of a narrow bezel of the display panel.

It is to be noted that FIG. 3 merely shows that the fingerprint identification region occupies twenty five percent of the total area of the display region illustratively. In other embodiments, the size of the fingerprint identification region may be designed according to actual requirements, such as fifty percent of the total area of the display region, the whole display region, or only the region a finger easily touches below the center of the display region. This embodiment of the present disclosure does not limit the position and size of the fingerprint identification region.

On the basis of the preceding technical solution, continue to refer to FIG. 3. Optionally, the multiple fingerprint scanning lines 14 include multiple reset control scanning lines 141 and multiple output control scanning lines 142. The first fingerprint-identification cascade scanning circuit 221 is electrically connected to the multiple reset control scanning lines 141 and configured to output reset control signals for fingerprint identification to the multiple reset control scanning lines 141. The second fingerprint-identification cascade scanning circuit 222 is electrically connected to the multiple output control scanning lines 142 and configured to output output-control signals for the fingerprint identification to the multiple reset control scanning lines 142.

Figure 5:
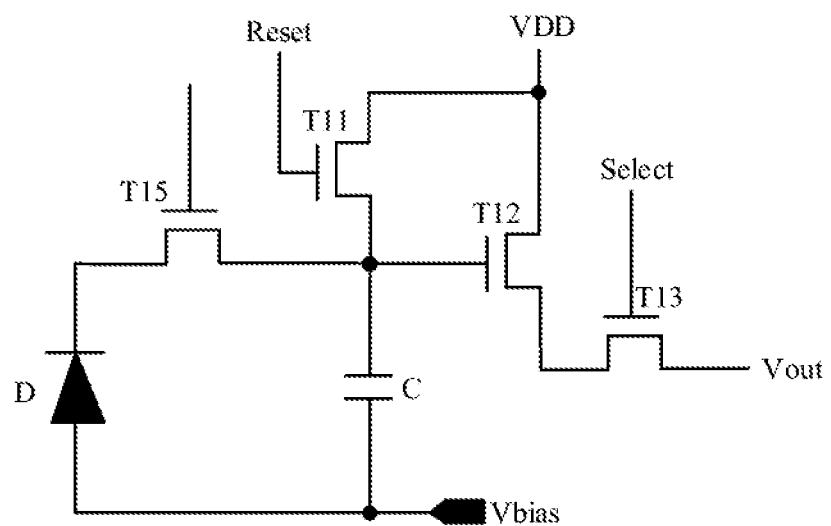
FIG. 5 is a schematic block diagram of a 4T1D fingerprint identification circuit.

It is to be understood that FIG. 3 merely shows that the first fingerprint-identification cascade scanning circuit 221 is disposed on the left bezel of the display panel and the second fingerprint-identification cascade scanning circuit 222 is disposed on the right bezel of the display panel illustratively. In other embodiments, the first fingerprint-identification cascade scanning circuit 221 may be disposed on the right bezel of the display panel, and the second fingerprint-identification cascade scanning circuit 222 may be disposed on the left bezel of the display panel. FIG. 5 is a circuit diagram of a 4T1D fingerprint identification circuit. Compared with that in FIG. 1, the fingerprint identification circuit shown in FIG. 5 further includes a fifth thin film transistor T15. When the 4T1D fingerprint identification circuit shown in FIG. 5 is used, the fingerprint-identification cascade scanning circuit may further be provided with a third fingerprint-identification cascade scanning circuit to control the fifth thin film transistor T15 to turn on and turn off. The third fingerprint-identification cascade scanning circuit may be disposed on the left bezel or the right bezel of the display panel, which may be selected according to actual circumstances in specific implementation.

Figure 6:
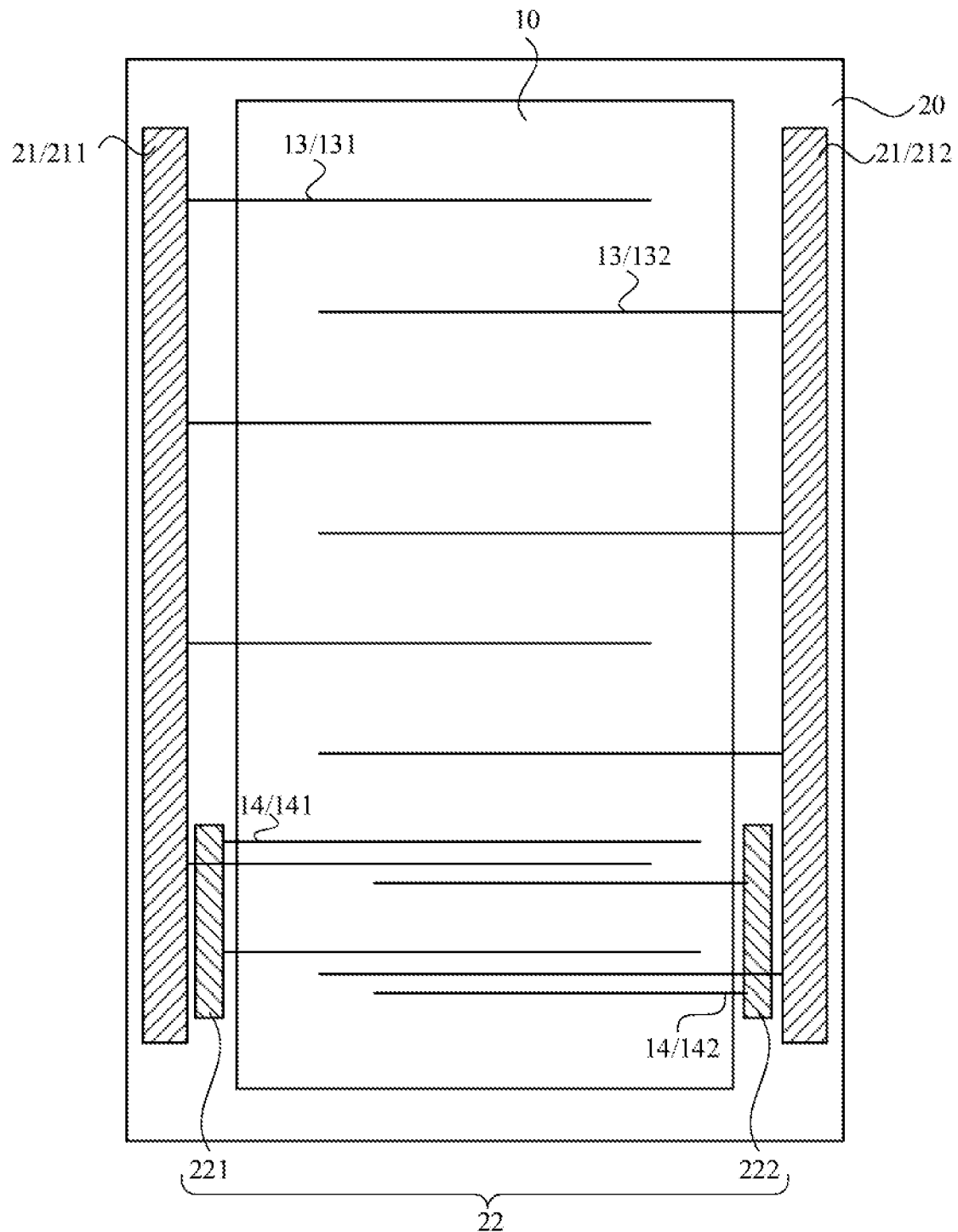
FIG. 6 is a structural diagram of another display panel according to an embodiment of the present disclosure.

FIG. 6 is a structural diagram of another display panel according to an embodiment of the present disclosure. Referring to FIG. 6, optionally, the display cascade scanning circuit 21 includes a first display cascade scanning circuit 211 and a second display cascade scanning circuit 212. The first display cascade scanning circuit 211 and the second display cascade scanning circuit 212 are disposed in the border region and located at two opposite sides of the display region 10.

Illustratively, the first display cascade scanning circuit 211 is disposed on the left bezel of the display panel, and the second display cascade scanning circuit 212 is disposed on the right bezel of the display panel. Such configuration helps the left bezel and the right bezel to have symmetrical widths and is beneficial to the circuit design and wiring arrangement.

Optionally, the first display cascade scanning circuit is electrically connected to an odd-numbered row of the multiple display scanning lines, and the second display cascade scanning circuit is electrically connected to an even-numbered row of the multiple display scanning lines. Alternatively, both the first display cascade scanning circuit and the second display cascade scanning circuit are electrically connected to each display scanning line.

As an example, continuing to referring to FIG. 6, the first display cascade scanning circuit 211 is electrically connected to the odd-numbered row of the multiple display scanning lines 131, and the second display cascade scanning circuit 212 is electrically connected to the even-numbered row of the multiple display scanning lines 132.

Figure 7:
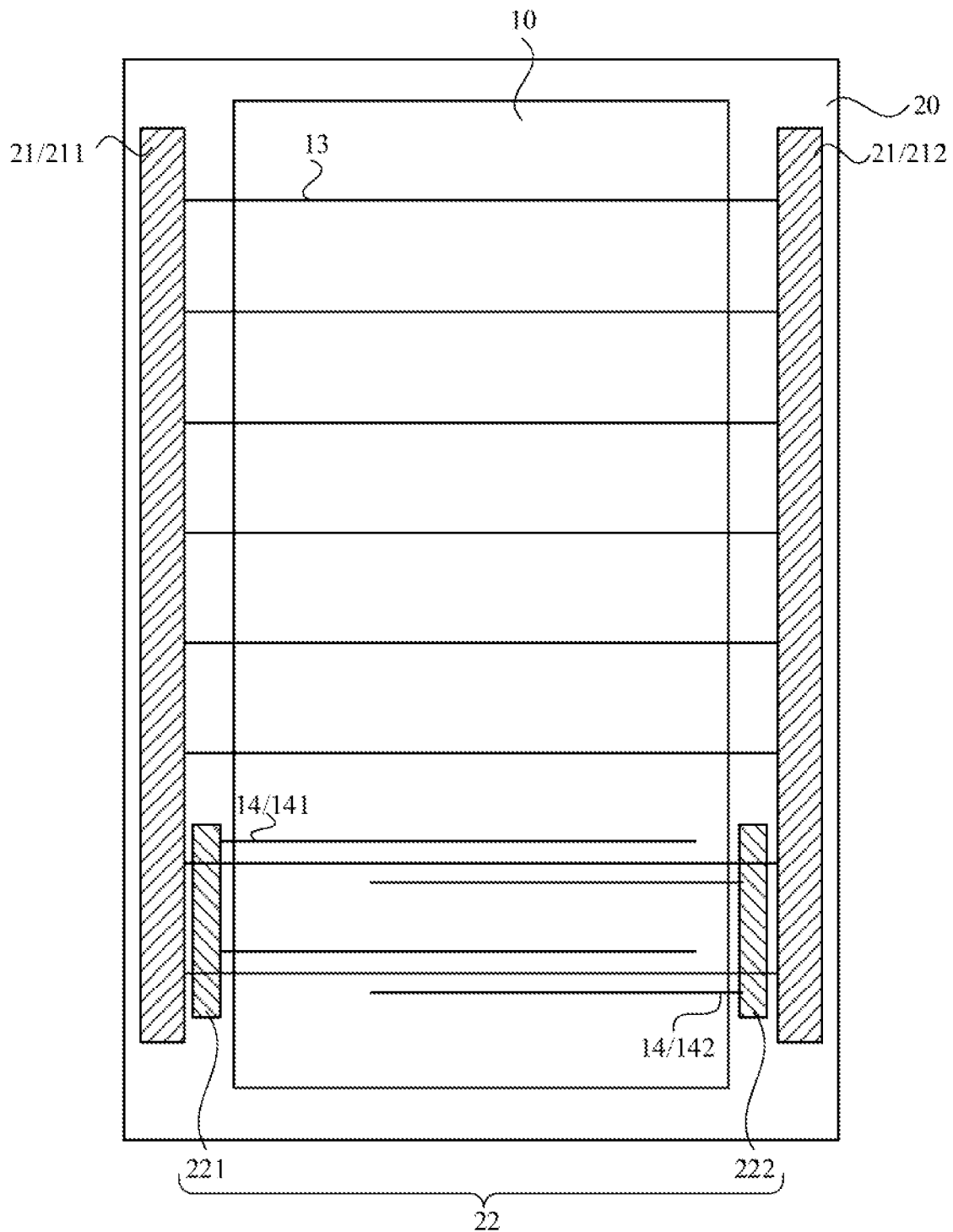
FIG. 7 is a structural diagram of another display panel according to an embodiment of the present disclosure.

FIG. 7 is a structural diagram of another display panel according to an embodiment of the present disclosure. Referring to FIG. 7, both the first display cascade scanning circuit 211 and the second display cascade scanning circuit 212 are electrically connected to each display scanning line 13.

It is to be understood that for simplification, the pixel units and the fingerprint identification elements are omitted in FIGS. 6 and 7, and the embodiments described below are similar. FIG. 6 merely shows that the first display cascade scanning circuit 211 is disposed on the left bezel of the display panel and the second display cascade scanning circuit 212 is disposed on the right bezel of the display panel illustratively. In other embodiments, the first display cascade scanning circuit 211 may be disposed on the right bezel of the display panel, and the second display cascade scanning circuit 212 may be disposed on the left bezel of the display panel, which can be selected according to actual needs in specific implementation.

Optionally, the display cascade scanning circuit is disposed between the fingerprint-identification cascade scanning circuit and the display region. Alternatively, the fingerprint-identification cascade scanning circuit is disposed between the display cascade scanning circuit and the display region.

Figure 8:
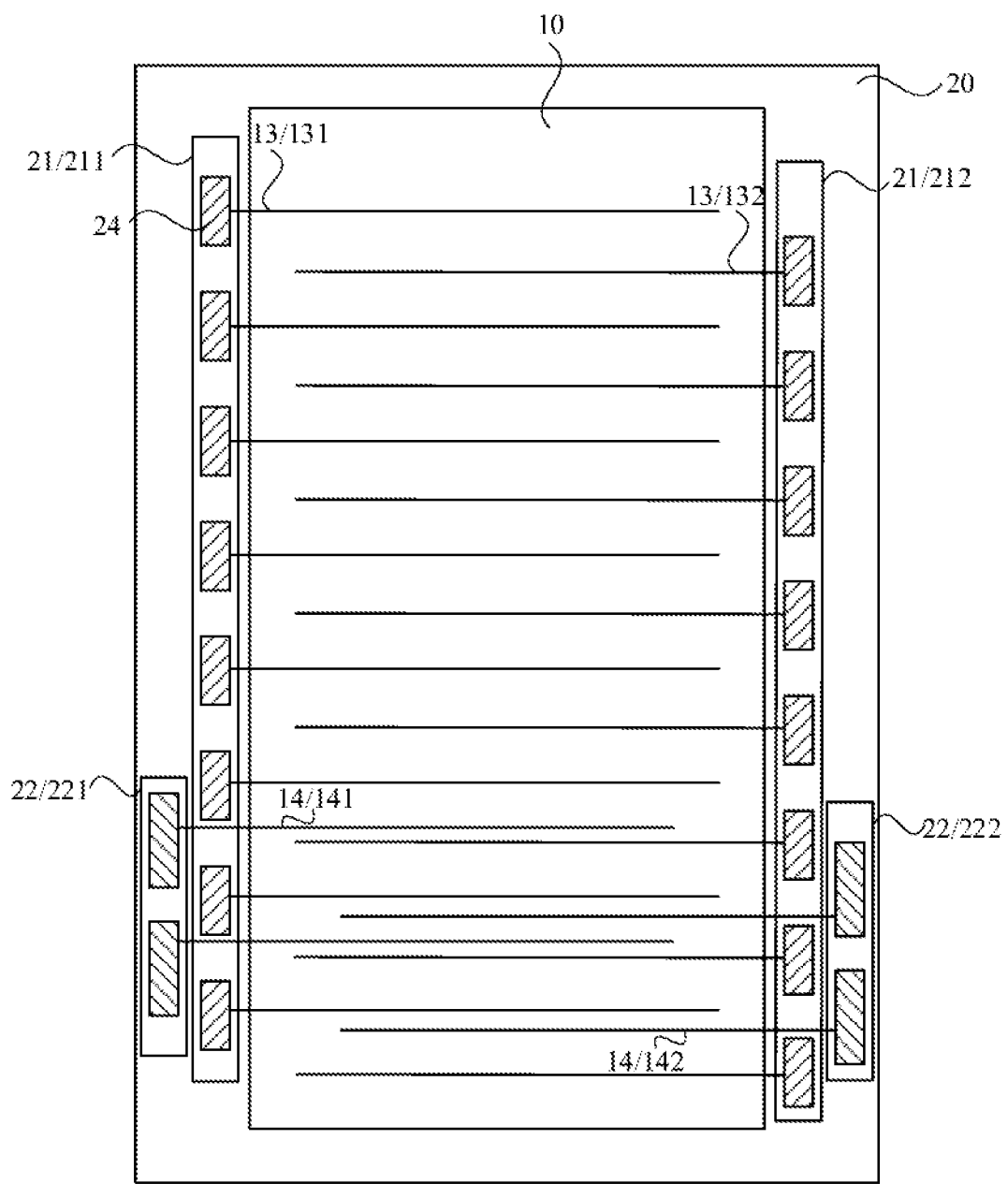
FIG. 8 is a structural diagram of another display panel according to an embodiment of the present disclosure.

FIG. 8 is a structural diagram of another display panel according to an embodiment of the present disclosure. Referring to FIG. 8, optionally, the display cascade scanning circuit 21 is disposed between the fingerprint-identification cascade scanning circuit 22 and the display region 10. The display cascade scanning circuit 21 includes multiple display drive shift registers 24. Each fingerprint scanning line 14 penetrates through a gap between two adjacent display drive shift registers 24 and is electrically connected to the fingerprint-identification cascade scanning circuit 22.

Figure 9:
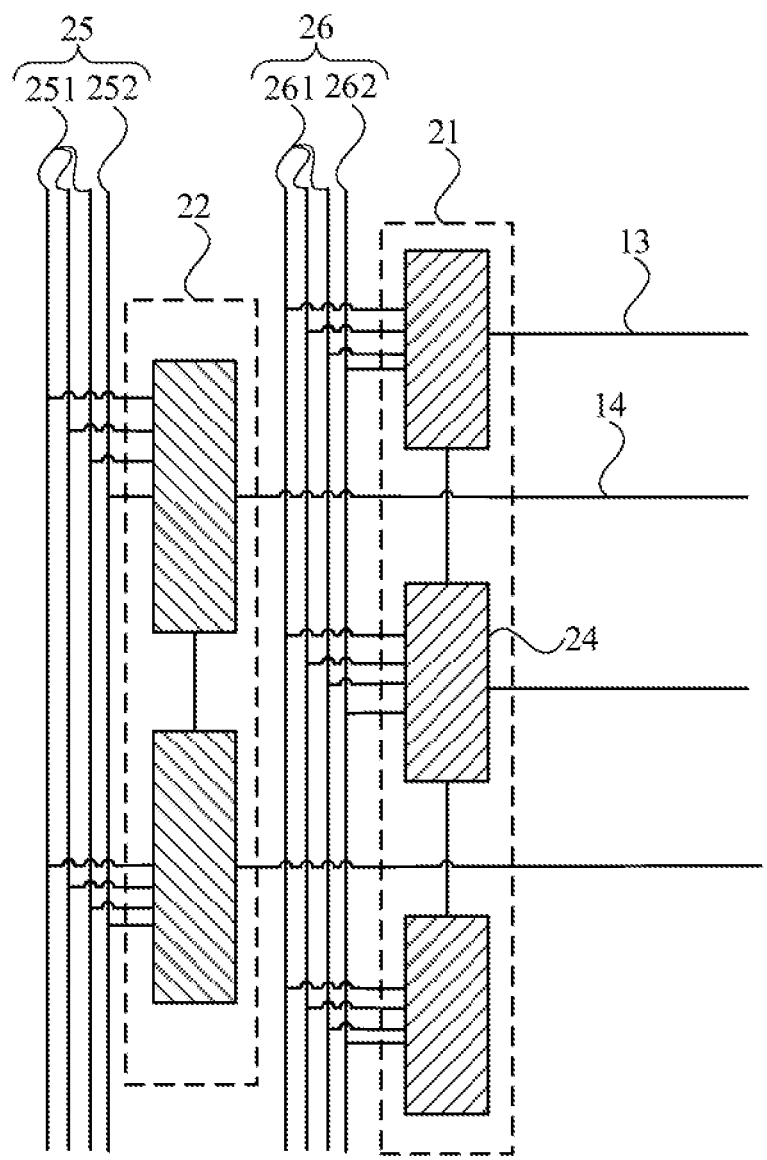
FIG. 9 is a partial structural diagram of FIG. 8.

FIG. 9 is a partial structural diagram of FIG. 8. Referring to FIG. 9, optionally, the border region further includes a first wiring region 25 disposed on one side of the fingerprint-identification cascade scanning circuit 22, and a second wiring region 26 disposed on one side of the display cascade scanning circuit 21. The first wiring region 25 includes multiple first clock signal lines 251 and at least one first power line 252. The multiple first clock signal lines 251 and the at least one first power line 252 are electrically connected to the fingerprint-identification cascade scanning circuit 22. The second wiring region 26 includes multiple second clock signal lines 261 and at least one second power line 262. The multiple second clock signal lines 261 and the at least one second power line 262 are electrically connected to the display cascade scanning circuit 21.

It is to be understood that each first clock signal line 251 and each second clock signal line 261 provide pulse clock signals for the fingerprint-identification cascade scanning circuit 22 and the display cascade scanning circuit 21, respectively, and each first power line 252 and each second power line 262 provide power signals for the fingerprint-identification cascade scanning circuit 22 and the display cascade scanning circuit 21, respectively. In specific implementation, transverse wires (such as various scanning lines, wires for electrically connecting clock signal lines to cascaded scanning circuits, and wires for electrically connecting power lines to the various cascaded scanning circuits) and longitudinal wires (such as the clock signal lines and the power lines) may be formed by different metal layers. When some wires intersect with each other or lack arrangement space, these wires can be arranged via metal overpasses in different layers. In specific implementation, the arrangement mode of wires may be configured according to actual circumstances, which is not limited in this embodiment of the present disclosure.

Figure 10:
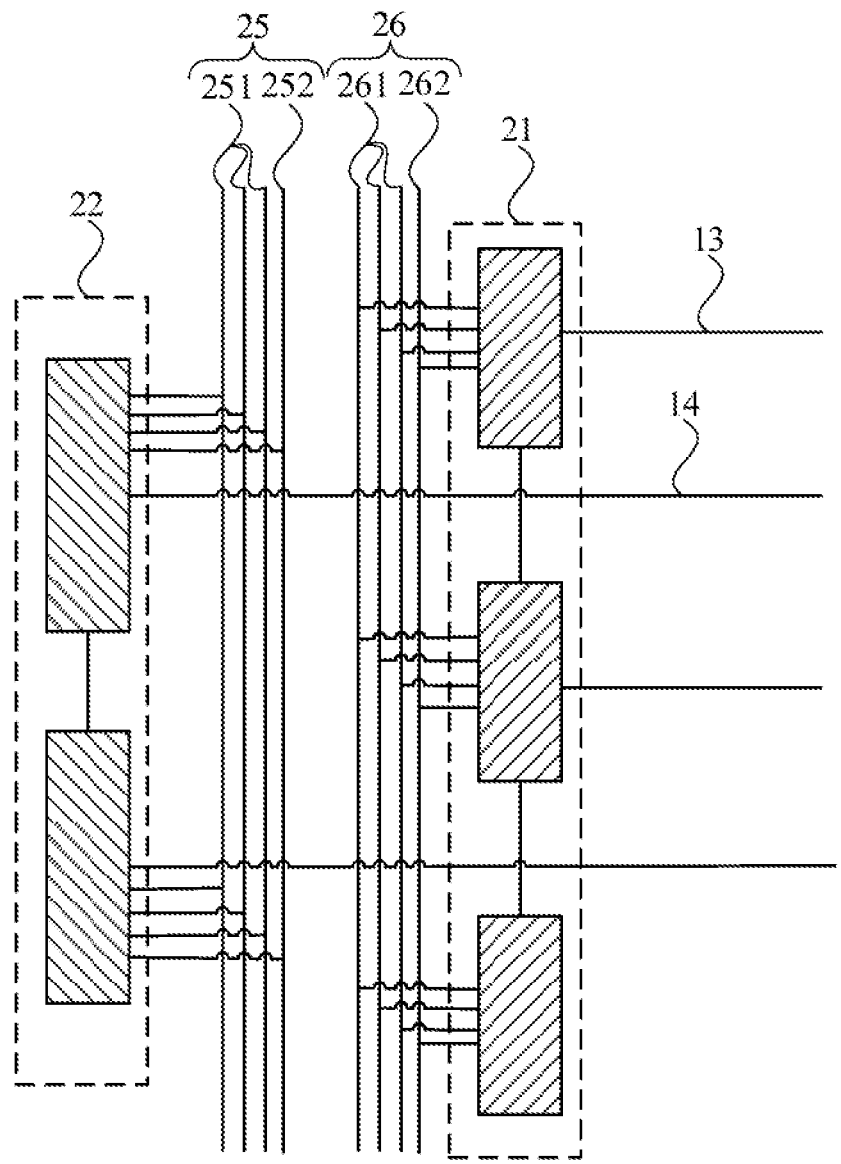
FIG. 10 is another partial structural diagram of FIG. 8.

It is to be noted that FIG. 9 merely shows that the first wiring region 25 is disposed at the left side of the fingerprint-identification cascade scanning circuit 22 and the second wiring region 26 is disposed at the right side of the display cascade scanning circuit 21 illustratively. In other embodiments, the first wiring region 25 and the second wiring region 26 may be disposed at other positions. As another example, FIG. 10 is another partial structural diagram of FIG. 8. Referring to FIG. 10, different from that in FIG. 9, the first wiring region 25 is disposed at the right side of the fingerprint-identification cascade scanning circuit 22 and the second wiring region 26 is disposed at the left side of the display cascade scanning circuit 21. That is, the first wiring region 25 and the second wiring region 26 are disposed between the fingerprint-identification cascade scanning circuit 22 and the display cascade scanning circuit 21. Such configuration can lead wires to be more centralized and is beneficial to wiring arrangement.

Figure 11:
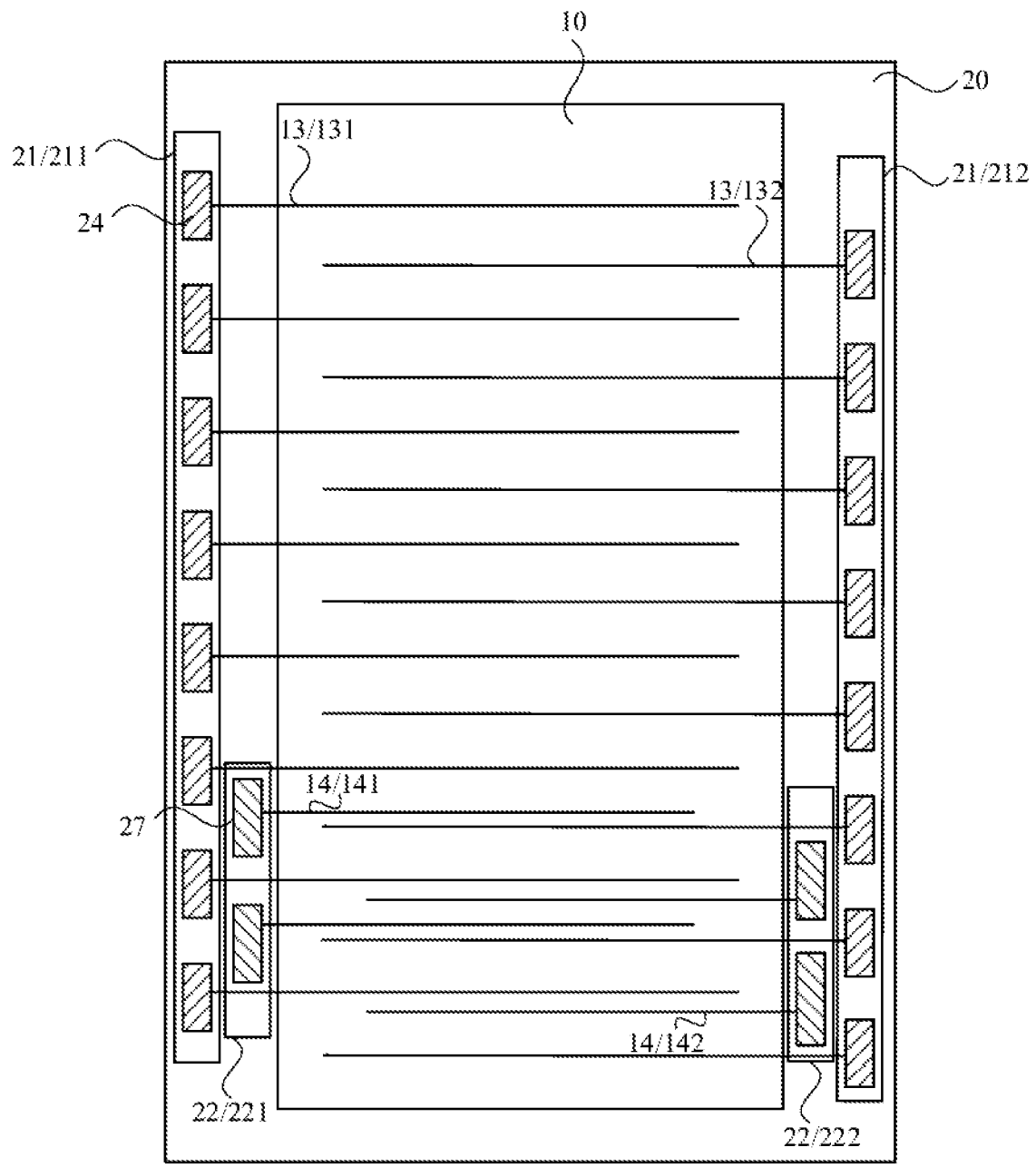
FIG. 11 is a structural diagram of another display panel according to an embodiment of the present disclosure.

FIG. 11 is a structural diagram of another display panel according to an embodiment of the present disclosure. Referring to FIG. 11, optionally, the fingerprint-identification cascade scanning circuit 22 is disposed between the display cascade scanning circuit 21 and the display region 10. The fingerprint-identification cascade scanning circuit 22 includes multiple fingerprint-identification drive shift registers 27. Each of at least part of the multiple display scanning lines 13 penetrates through a gap between two adjacent fingerprint-identification shift registers 27 and is electrically connected to the display cascade scanning circuit 21.

FIG. 11 illustrates that as the fingerprint identification region occupies part of the display region, each of the multiple display scanning lines 13 may sometimes penetrate through the gap between two adjacent fingerprint-identification shift registers 27 and would then be electrically connected to the display cascade scanning circuit 21. When the fingerprint identification region occupies the whole display region, each display scanning line 13 penetrates through the gap between two fingerprint identification shift registers 27.

Figure 12:
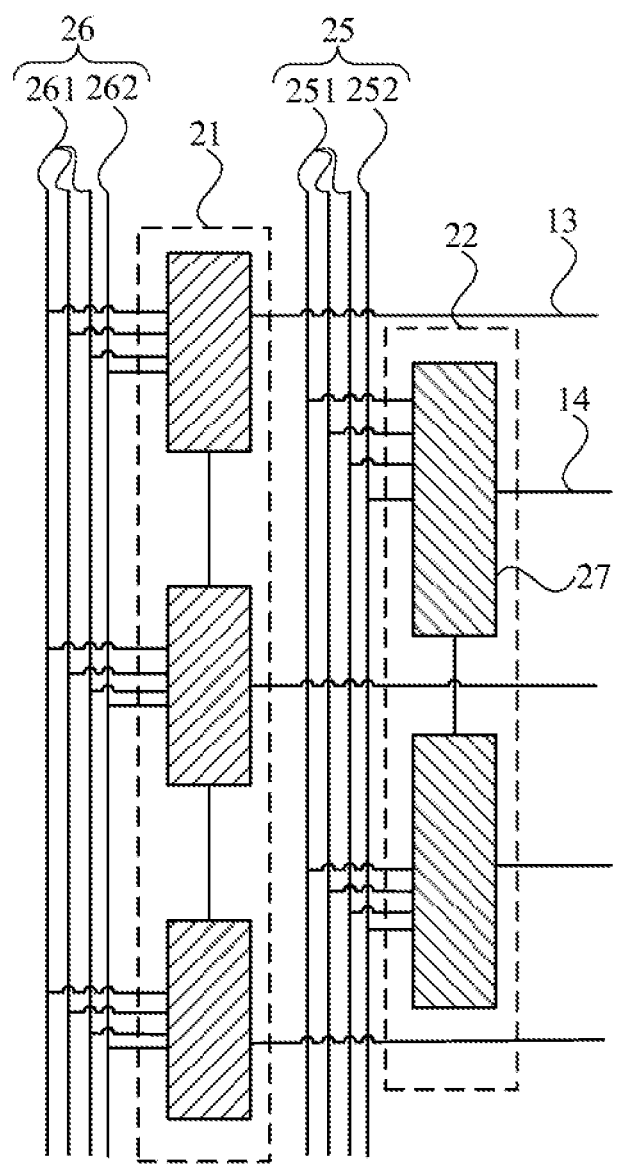
FIG. 12 is a partial structural diagram of FIG. 11.

FIG. 12 is a partial structural diagram of FIG. 11. Referring to FIG. 12, optionally, the border region 20 further includes the first wiring region 25 at the side of the fingerprint-identification cascade scanning circuit 22, and the second wiring region 26 at the side of the display cascade scanning circuit 21. The first wiring region 25 includes the multiple first clock signal lines 251 and at least one first power line 252. The multiple first clock signal lines 251 and the at least one first power line 252 are electrically connected to the fingerprint-identification cascade scanning circuit 22. The second wiring region 26 includes the multiple second clock signal lines 261 and at least one second power line 262. The multiple second clock signal lines 261 and the at least one second power line 262 are electrically connected to the display cascade scanning circuit 21.

It is to be understood that each first clock signal line 251 and each second clock signal line 261 provide pulse clock signals for the fingerprint-identification cascade scanning circuit 22 and the display cascade scanning circuit 21, respectively, and each first power line 252 and each second power line 262 provide power signals for the fingerprint-identification cascade scanning circuit 22 and the display cascade scanning circuit 21, respectively. In specific implementation, the transverse wires (such as the various scanning lines, the wires for electrically connecting the clock signal lines to the cascaded scanning circuits, and the wires for electrically connecting the power lines to the various cascaded scanning circuits) and the longitudinal wires (such as the clock signal lines and the power lines) may be formed by different metal layers. When some wires intersect with each other or lack arrangement space, these wires can be arranged via metal overpasses in different layers. In specific implementation, the arrangement mode of wires may be configured according to actual circumstances, which is not limited in this embodiment of the present disclosure.

Figure 13:
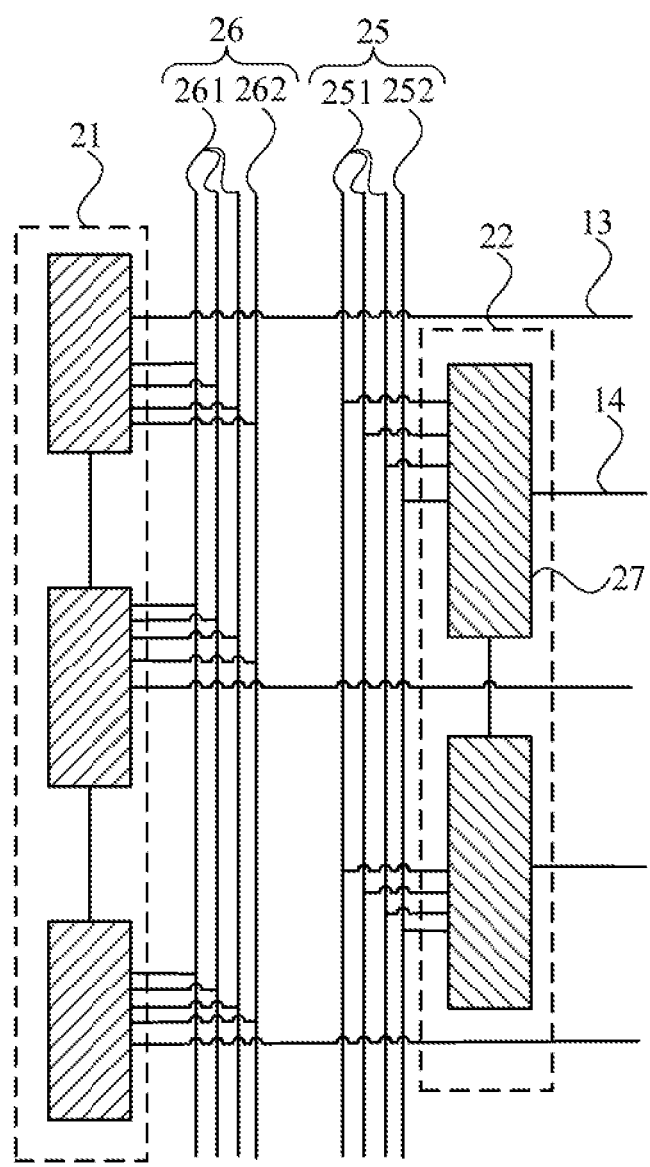
FIG. 13 is another partial structural diagram of FIG. 11.

It is to be noted that FIG. 12 merely shows that the first wiring region 25 is disposed at the left side of the fingerprint-identification cascade scanning circuit 22 and the second wiring region 26 is disposed at the right side of the display cascade scanning circuit 21 illustratively. In other embodiments, the first wiring region 25 and the second wiring region 26 may be disposed at other positions. As an example, FIG. 13 is another partial structural diagram of FIG. 11. Referring to FIG. 13, different from that in FIG. 12, the second wiring region 26 is disposed at the right side of the display cascade scanning circuit 21 and the first wiring region 25 is disposed at the left side of the fingerprint-identification cascade scanning circuit 22. That is, the first wiring region 25 and the second wiring region 26 are between the display cascade scanning circuit 21 and the fingerprint-identification cascade scanning circuit 22. Such configuration can lead wires to be more centralized and is beneficial to wiring arrangement. It is to be understood that FIGS. 9, 10, 12 and 13 illustratively show the border region at one side of the display panel. Under the left-right relationship in corresponding drawings, the other side of the border region may be configured symmetrically.

Figure 14:
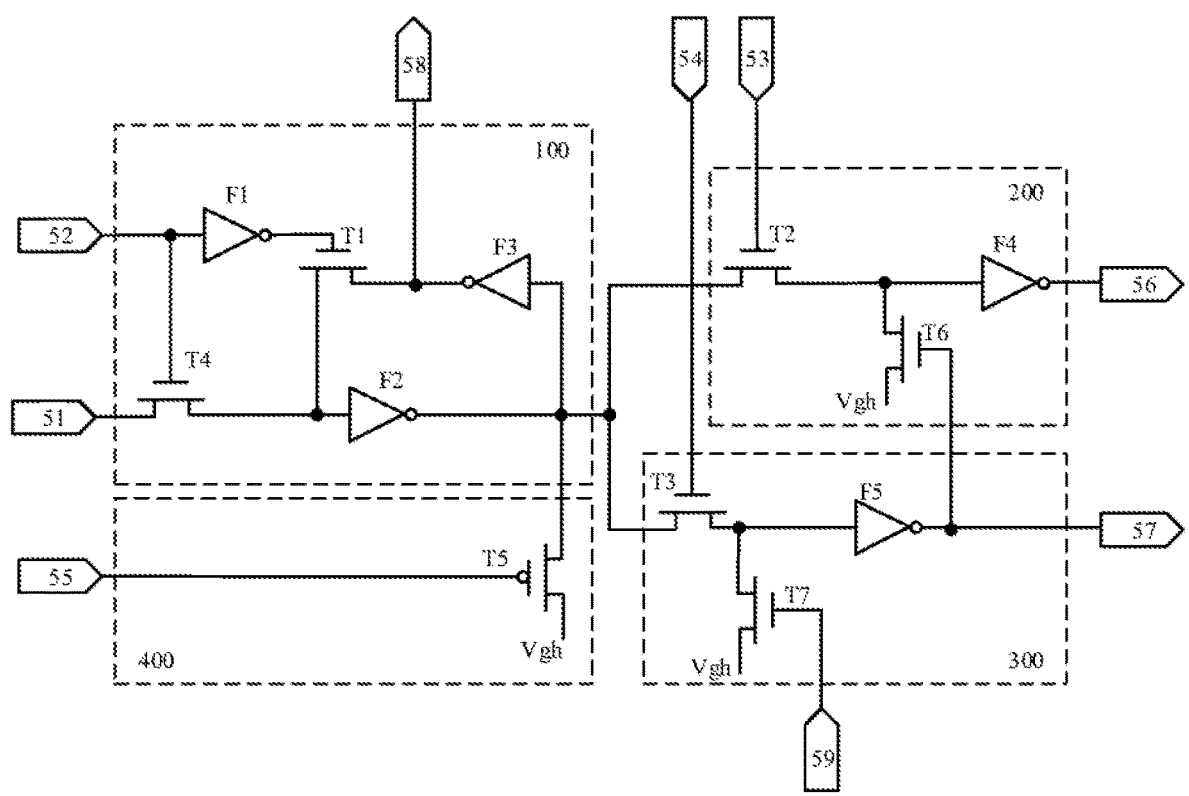
FIG. 14 is a schematic block diagram of a shift register according to an embodiment of the present disclosure.

In this embodiment, each display drive shift register and each fingerprint identification shift register may have the same structure and control outputs by using different control signals so that display scanning and fingerprint identification scanning can be implemented. FIG. 14 is a schematic block diagram of a shift register according to an embodiment of the present disclosure. Referring to FIG. 14, the shift register includes a latch circuit 100, a first operational circuit 200, a second operational circuit 300, a restart circuit 400 and a first potential Vgh. The first potential Vgh is a logic high-level.

An input terminal of the first operational circuit 200 and an input terminal of the second operational circuit 300 are electrically connected to an output terminal of the latch circuit 100 separately. An output terminal of the first operational circuit 200 is electrically connected to a first output signal output terminal 56 of the shift register. An output terminal of the second operational circuit 300 is electrically connected to a second output signal output terminal 57 of the shift register.

The latch circuit 100 includes a first transistor T1, a first inverter F1, a second inverter F2, a third inverter F3 and a fourth transistor T4. An output terminal of the first inverter F1 is electrically connected to a gate of the first transistor T1. A first electrode of the first transistor T1 is electrically connected to an input terminal of the second inverter F2. A second electrode of the first transistor T1 is electrically connected to an output terminal of the third inverter F3 and a lower-stage signal output terminal 58 of the shift register. An output terminal of the second inverter F2 is electrically connected to an input terminal of the third inverter F3 and is configured as the output terminal of the latch circuit 100. An input terminal of the first inverter F1 and a gate of the fourth transistor T4 are electrically connected to a latch signal input terminal 52 of the shift register. A first pole of the fourth transistor T4 is electrically connected to a start signal input terminal 51 of the shift register. A second electrode of the fourth transistor T4 is electrically connected to the input terminal of the second inverter F2. The first operational circuit 200 includes a second transistor T2, a first pull-down member and a fourth inverter F4. A gate of the second transistor T2 is electrically connected to a first clock signal input terminal 53 of the shift register. A first electrode of the second transistor T2 is electrically connected to the input terminal of the first operational circuit 200. Input terminals of the first pull-down member and the fourth inverter F4 are electrically connected to a second electrode of the second transistor T2. The first pull-down member includes a sixth transistor T6. A gate of the sixth transistor T6 is electrically connected to the output terminal of the second operational circuit 300. A first electrode of the sixth transistor T6 is electrically connected to the second electrode of the second transistor T2. A second electrode of the sixth transistor T6 is electrically connected to the first potential Vgh.

The second operational circuit 300 includes a third transistor T3, a second pull-down member and a fifth inverter F5. A gate of the third transistor T3 is electrically connected to a second clock signal input terminal 54 of the shift register. A first electrode of the third transistor T3 is electrically connected to the input terminal of the second operational circuit 300. Input terminals of the second pull-down member and the fifth inverter F5 are electrically connected to a second electrode of the third transistor T3. The second pull-down member includes a seventh transistor T7. A gate of the seventh transistor T7 is connected to a control signal input terminal 59 of the shift register. A first electrode of the seventh transistor T7 is electrically connected to the second electrode of the third transistor T3. A second electrode of the seventh transistor T7 is electrically connected to the first potential Vgh.

The restart circuit 400 includes a fifth transistor T5. A gate of the fifth transistor T5 is electrically connected to a reset signal input terminal 55 of the shift register. A first electrode of the fifth transistor T5 is electrically connected to the output terminal of the latch circuit 100. A second electrode of the fifth transistor is electrically connected to the first potential Vgh.

Figure 15:
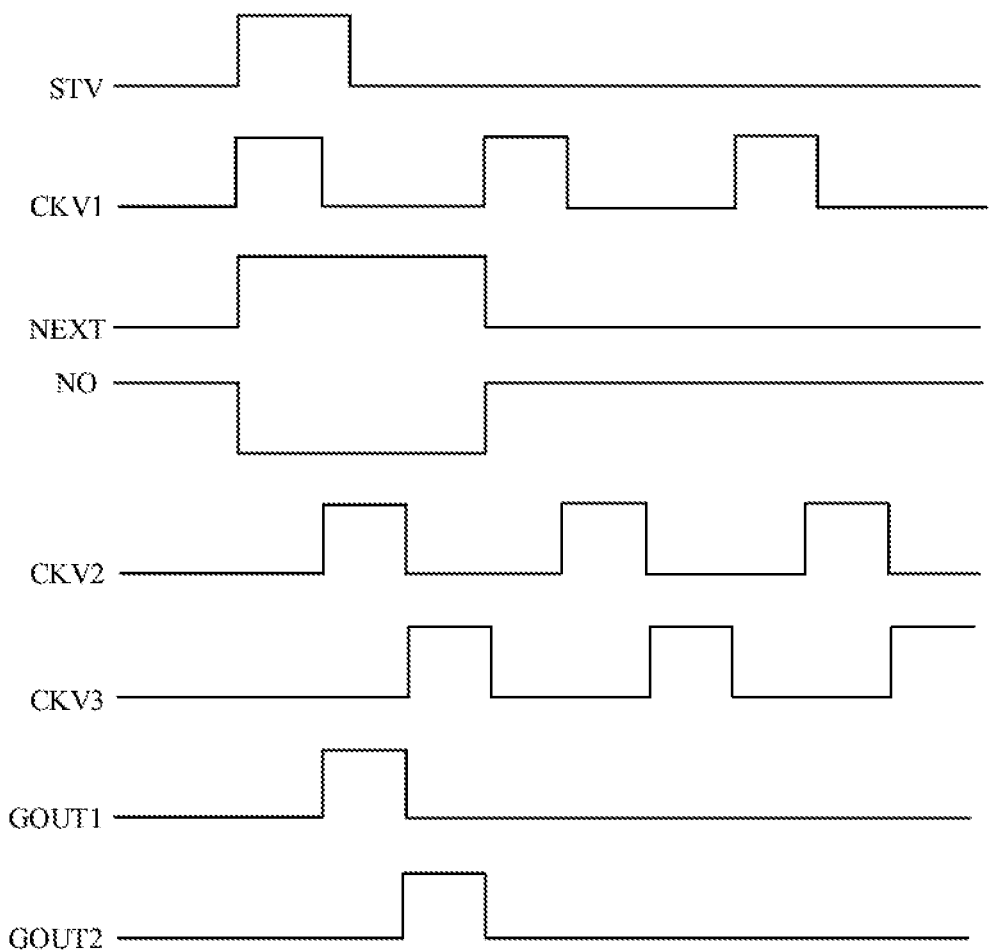
FIG. 15 is timing graphs of various input terminals and output terminals of the shift register shown in FIG. 14.

FIG. 15 is timing graphs of various input terminals and output terminals of the shift register shown in FIG. 14. STV denotes a start signal inputted via the start signal input terminal 51. CKV1 denotes a latch signal inputted via the latch signal input terminal 52. NO denotes an output signal of the latch circuit 100. CKV2 denotes a first clock signal inputted via the first clock signal input terminal 53. CKV3 denotes a second clock signal inputted via the second clock signal input terminal 54. GOUT1 denotes a first output signal outputted via the first output signal output terminal 56. GOUT2 denotes a second output signal outputted via the second output signal output terminal 57. NEXT denotes a lower-stage signal outputted via the lower-stage signal output terminal 58. Referring to FIGS. 14 and 15, when the latch signal CKV1 is active high, the fourth transistor T4 is turned on, and the start signal STV enters the latch circuit 100; when the latch signal CKV1 is active low, the first transistor T1 is turned on, and the latch circuit 100 operates in a latch state and generates the output signal of the latch circuit 100 and the lower-stage signal NEXT.

The second transistor T2 outputs the output signal of the latch circuit 100 under the control of the first clock signal CKV2. When the first clock signal CKV2 is active, the output signal of the latch circuit 100 enters the fourth inverter F4 and the fourth inverter F4 outputs the first output signal GOUT1. When the second clock signal CKV3 is active, the third transistor T3 is turned on, enables the output signal of the latch circuit 100 to enter the third transistor T3, and turns on the second output signal GOUT2. Meanwhile, the sixth transistor T6 pulls the first output signal GOUT1 down when the second output signal Gout2 is active, ensuring that only one of the fourth inverter F4 or the fifth inverter F5 is turned on. The sixth transistor T6 has the same function as the seventh transistor T7. That is, there is a pull-down member before an inverter corresponding to each-stage gate.

The above merely shows the structure and principle of the shift register illustratively. The structure of the shift register may be selected according to actual requirements in specific implementation, which is not limited in this embodiment of the present disclosure.

Figure 16:
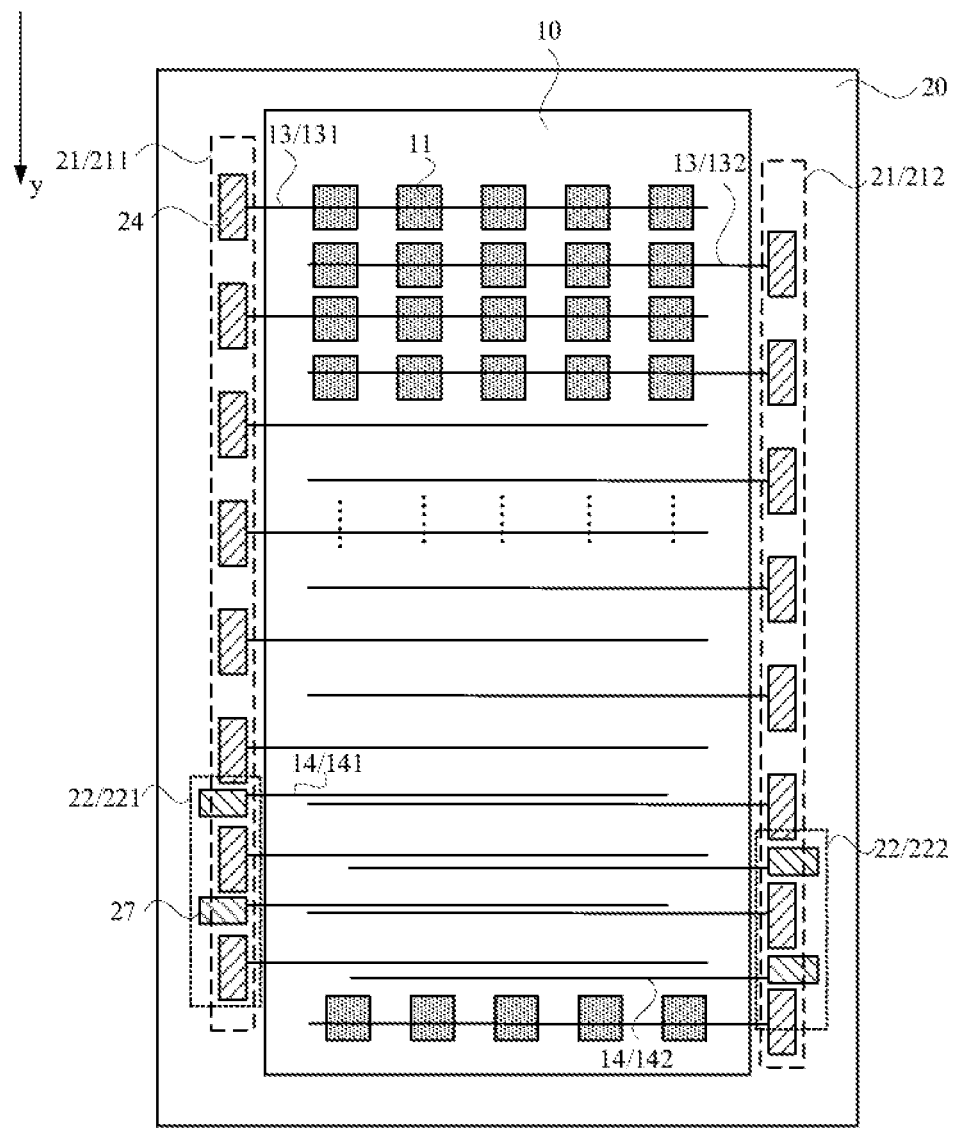
FIG. 16 is a structural diagram of another display panel according to an embodiment of the present disclosure.

FIG. 16 is a structural diagram of another display panel according to an embodiment of the present disclosure. Referring to FIG. 16, optionally, the display region 10 includes pixel units 11 arranged in an array. The display cascade scanning circuit 21 includes multiple display drive shift registers 24. The fingerprint-identification cascade scanning circuit 22 includes multiple fingerprint-identification drive shift registers 27. At least part of the multiple display drive shift register 24 are alternately arranged with the multiple fingerprint-identification drive shift registers 27 along a column direction y.

At least part of the multiple display drive shift register 24 are alternately arranged with the multiple fingerprint-identification drive shift registers 27. Such configuration helps reduce the bezel of the display panel and increase the screen-to-body ratio.

Figure 17:
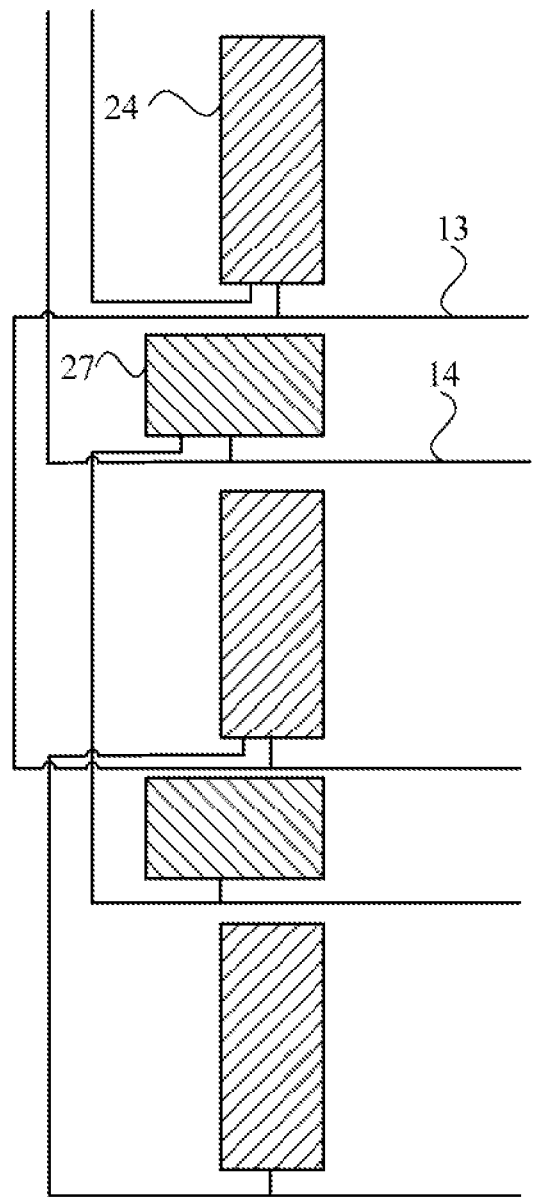
FIG. 17 is a partial structural diagram of FIG. 16.

FIG. 17 is a partial structural diagram of FIG. 16. The multiple display drive shift registers 24 are cascaded to each other. The multiple fingerprint identification drive shift registers 27 are cascaded to each other. Each output signal line is pulled out from a gap between shift registers. The border region further includes a wiring region (not shown in FIG. 17) for disposing wires such as clock signal lines and power lines.

Figure 18:
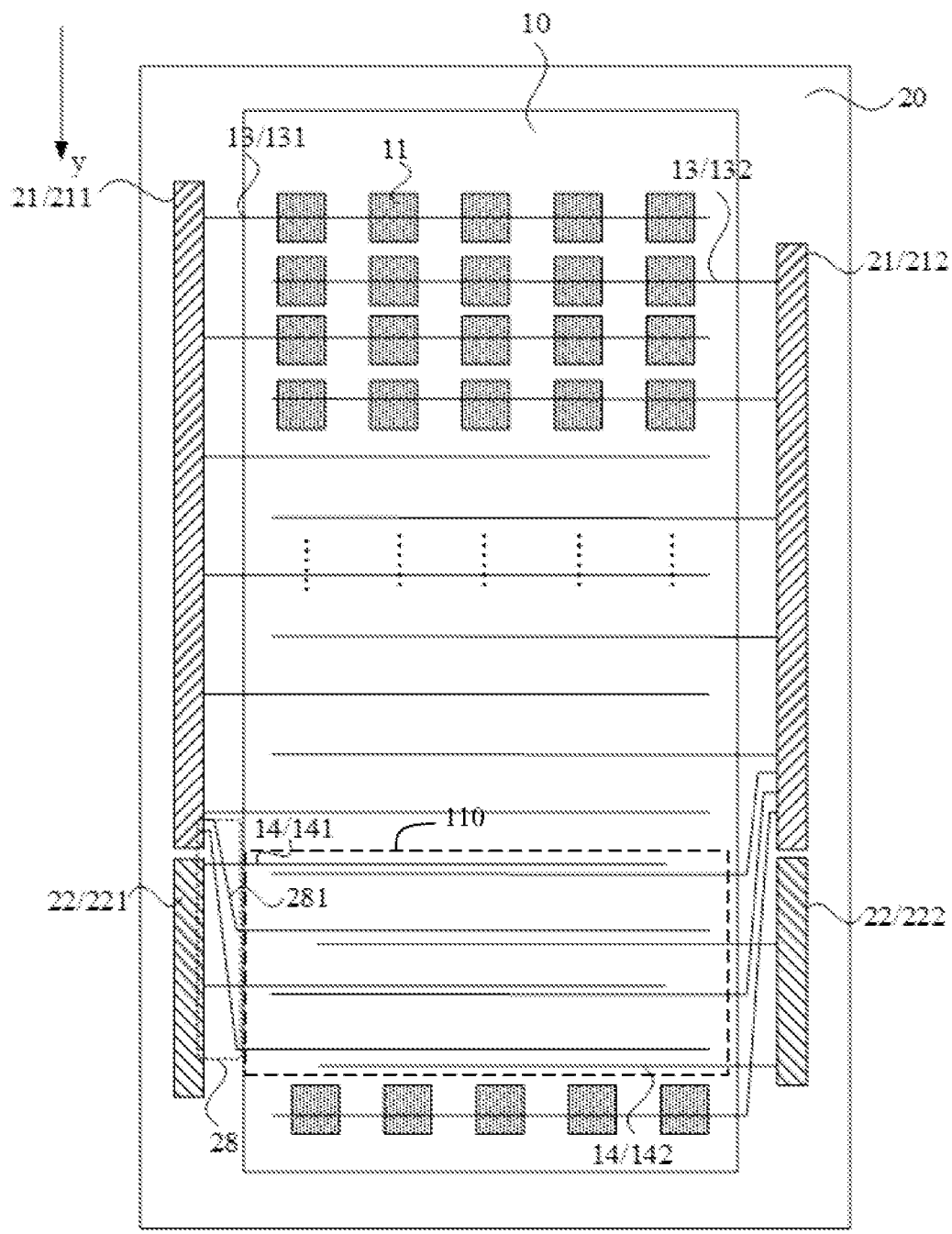
FIG. 18 is a structural diagram of another display panel according to an embodiment of the present disclosure.

FIG. 18 is a structural diagram of another display panel according to an embodiment of the present disclosure. Referring to FIG. 18, optionally, the display region 10 includes pixel units 11 arranged in an array. The display cascade scanning circuit 21 and the fingerprint-identification cascade scanning circuit 22 are sequentially arranged along a column direction y of the array.

Optionally, continuing to refer to FIG. 18, the display region 10 includes a fingerprint identification region 110. The multiple fingerprint scanning lines 14 are in the fingerprint identification region 110. The fingerprint-identification cascade scanning circuit 22 is in the border region at an outer side of an boundary of the fingerprint identification region 110.

It is to be understood that FIG. 18 merely shows the shape and size of the fingerprint identification region illustratively. In other embodiments, the shape and size of the fingerprint identification region may be designed according to actual requirements.

Continuing to refer to FIG. 18, optionally, a side of the border region 20 facing towards the display region 10 is further provided with an oblique wiring region 28. The oblique wiring region 28 includes multiple oblique wires 281. An extension direction of the multiple oblique wires 281 has an included angle of less than 90° with respect to the column direction y. At least part of the display cascade scanning circuit 21 is electrically connected to the multiple display scanning lines via the multiple oblique wires 281.

It is to be understood that when the display cascade scanning circuit 21 and the fingerprint-identification cascade scanning circuit 22 are sequentially arranged along the column direction y of the array, there is no display cascade scanning circuit 21 in the border region at two sides of the fingerprint identification region 110. To ensure the normal display of the pixel units in the fingerprint identification region 110, the display cascade scanning circuit 21 may be connected to the multiple display scanning lines of the fingerprint identification region 110 via the multiple oblique wires 281 shown in FIG. 18. In specific implementation, oblique angles of the multiple oblique wires 281 may be set according to the actual screen size.

Figure 19:
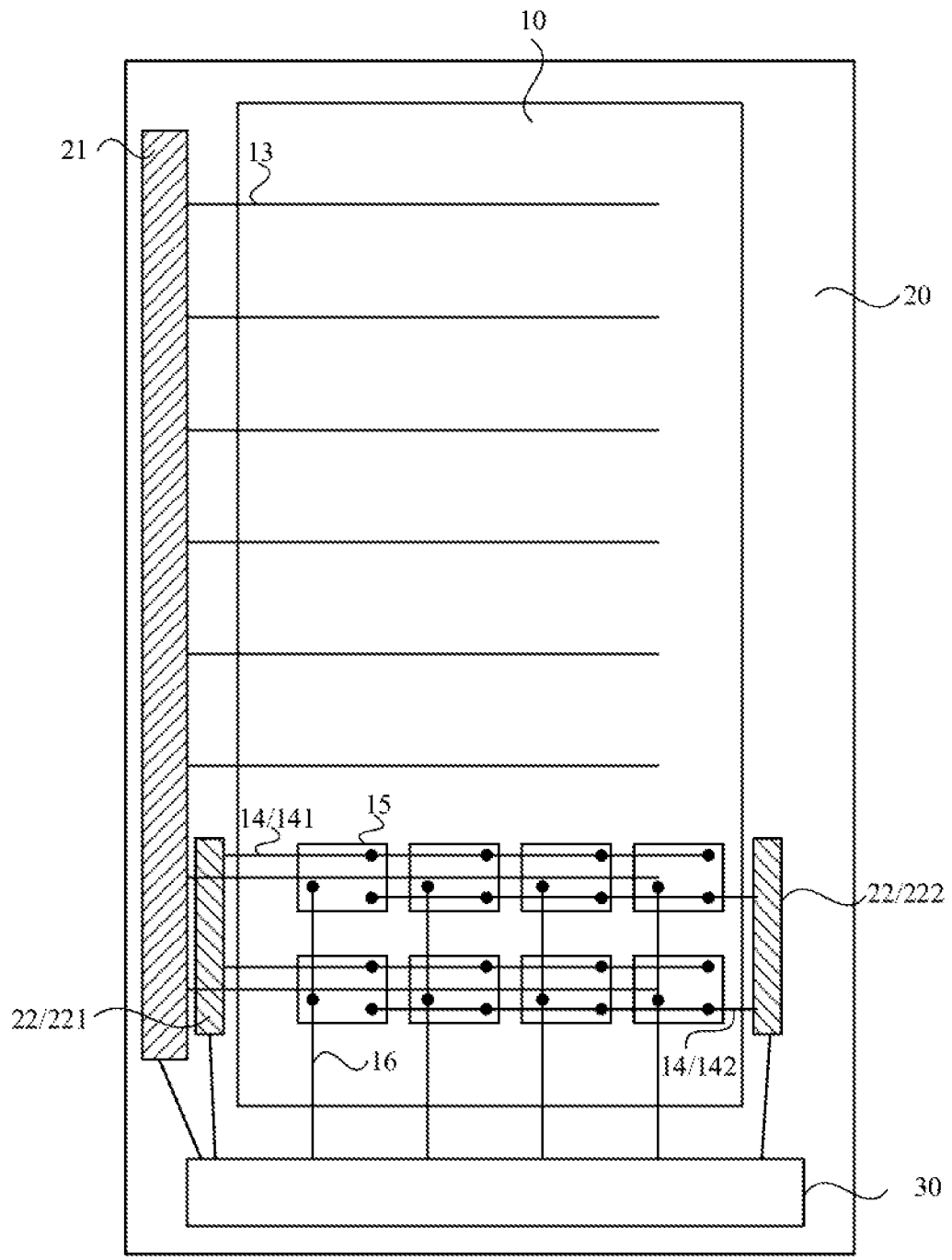
FIG. 19 is a structural diagram of another display panel according to an embodiment of the present disclosure.

FIG. 19 is a structural diagram of another display panel according to an embodiment of the present disclosure. Referring to FIG. 19, optionally, the display panel provided in this embodiment further includes a drive chip 30. The drive chip 30 is electrically connected to the input terminal of the display cascade scanning circuit 21 and the input terminal of the fingerprint-identification cascade scanning circuit 22.

Optionally, continuing to refer to FIG. 19, the display panel further includes multiple fingerprint identification circuits 15 arranged in an array. An output terminal of each column of the multiple fingerprint identification circuits 15 is electrically connected to the drive chip 30 via the output signal line 16.

It is to be understood that each fingerprint identification circuit 15 may be the 3T1D circuit or the 4T1D circuit according to the preceding embodiments, or may be other fingerprint identification circuits selected according to the design circumstances. In specific implementation, each fingerprint identification circuit 15 may be selected according to actual requirements.

Figure 20:
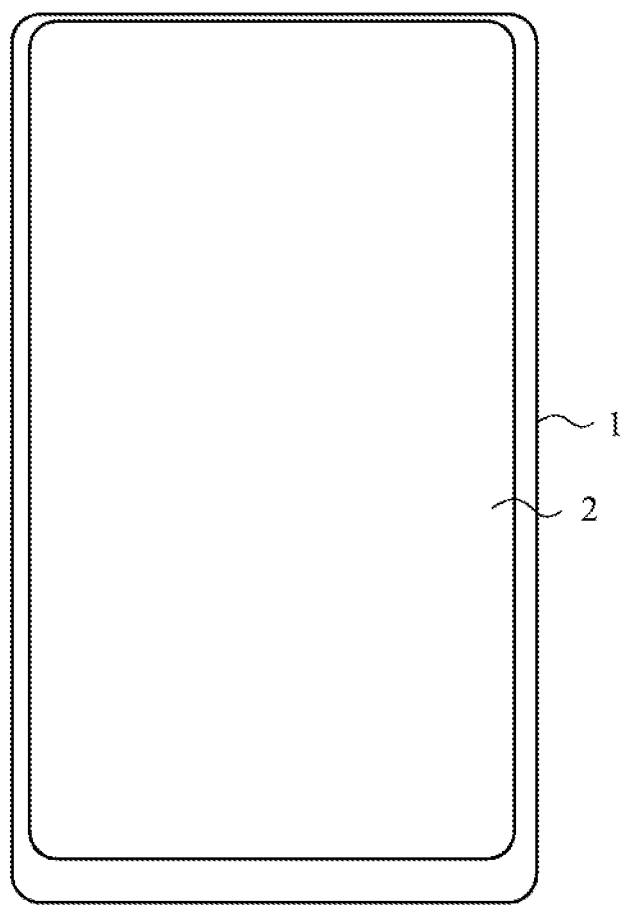
FIG. 20 is a structural diagram of a display device according to an embodiment of the present disclosure.

FIG. 20 is an outside sketch of a display device. Referring to FIG. 20, the display device 1 includes any one of the display panels 2 provided in the embodiments of the present disclosure. Specifically, the display device 1 may be a mobile phone, a computer, an intelligent wearable device or the like.

It is to be noted that the above are merely preferred embodiments of the present disclosure and the technical principles used therein. It will be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the preceding embodiments, the present disclosure is not limited to the preceding embodiments and may further include more other equivalent embodiments without departing from the concept of the present disclosure. The scope of the present disclosure is determined by the scope of the appended claims.

What is claimed is:

1. A display panel, comprising:
   a display region and a border region surrounding the display region, wherein a display cascade scanning circuit and a fingerprint-identification cascade scanning circuit are disposed in the border region;
   wherein the display region is provided with a plurality of display scanning lines and a plurality of fingerprint scanning lines;
   wherein the display cascade scanning circuit is electrically connected to each of the plurality of display scanning lines respectively, wherein the display cascade scanning circuit generates display scanning signals, and is configured to output the display scanning signals to the plurality of display scanning lines respectively;
   wherein the fingerprint-identification cascade scanning circuit is electrically connected to each of the plurality of fingerprint scanning lines respectively, wherein the fingerprint-identification cascade scanning circuit generates fingerprint-identification scanning signals, and is configured to output fingerprint scanning signals to the plurality of fingerprint scanning lines respectively;
   wherein the fingerprint-identification cascade scanning circuit comprises a first fingerprint-identification cascade scanning circuit and a second fingerprint-identification cascade scanning circuit, and wherein the first fingerprint-identification cascade scanning circuit and the second fingerprint-identification cascade scanning circuit are located in the border region at two opposite sides of the display region;
   wherein the plurality of fingerprint scanning lines comprises a plurality of reset control scanning lines and a plurality of output control scanning lines;
   wherein the first fingerprint-identification cascade scanning circuit is electrically connected to the plurality of reset control scanning lines respectively, wherein the first fingerprint-identification cascade scanning circuit is configured to generate and output reset control signals for fingerprint identification to the plurality of reset control scanning lines; and wherein the second fingerprint-identification cascade scanning circuit is electrically connected to the plurality of output control scanning lines respectively, wherein the second fingerprint-identification cascade scanning circuit is configured to generate and output output-control signals for the fingerprint identification to the plurality of reset control scanning lines respectively.

2. The display panel according to claim 1, wherein the display cascade scanning circuit comprises a first display cascade scanning circuit and a second display cascade scanning circuit; and wherein the first display cascade scanning circuit and the second display cascade scanning circuit are disposed at two opposite sides of the display region.

3. The display panel according to claim 2, wherein the first display cascade scanning circuit is electrically connected to an odd-numbered row of the plurality of display scanning lines respectively, and the second display cascade scanning circuit is electrically connected to an even-numbered row of the plurality of display scanning lines respectively.

4. The display panel according to claim 2, wherein both the first display cascade scanning circuit and the second display cascade scanning circuit are electrically connected to each of the plurality of display scanning lines respectively.

5. The display panel according to claim 1, wherein the display cascade scanning circuit is disposed between the fingerprint-identification cascade scanning circuit in the border region and the display region.

6. The display panel according to claim 5, wherein the display cascade scanning circuit is disposed between the fingerprint-identification cascade scanning circuit in the border region and the display region, and wherein the display cascade scanning circuit comprises a plurality of display drive shift registers; and wherein each of the plurality of fingerprint scanning lines passes through a gap between two adjacent shift registers of the plurality of display drive shift registers to connect to the fingerprint-identification cascade scanning circuit.

7. The display panel according to claim 6, further comprising a first wiring region disposed on one side of the fingerprint-identification cascade scanning circuit, and a second wiring region disposed on one side of the display cascade scanning circuit, wherein the first wiring region comprises a plurality of first clock signal lines and at least one first power line, and wherein the plurality of first clock signal lines and the at least one first power line are electrically connected to the fingerprint-identification cascade scanning circuit; and wherein the second wiring region comprises a plurality of second clock signal lines and at least one second power line, and wherein the plurality of second clock signal lines and the at least one second power line are electrically connected to the display cascade scanning circuit.

8. The display panel according to claim 5, wherein the fingerprint-identification cascade scanning circuit is disposed between the display cascade scanning circuit and the display region, and wherein the fingerprint-identification cascade scanning circuit comprises a plurality of fingerprint-identification drive shift registers; and wherein each of the plurality of display scanning lines at least partially passes through a gap between two adjacent shift registers of the plurality of fingerprint-identification shift registers.

9. The display panel according to claim 8, further comprising a first wiring region disposed on one side of the fingerprint-identification cascade scanning circuit, and a second wiring region disposed on one side of the display cascade scanning circuit, wherein the first wiring region comprises a plurality of first clock signal lines and at least one first power line, and wherein the plurality of first clock signal lines and the at least one first power line are electrically connected to the fingerprint-identification cascade scanning circuit; and wherein the second wiring region comprises a plurality of second clock signal lines and at least one second power line, and wherein the plurality of second clock signal lines and the at least one second power line are electrically connected to the display cascade scanning circuit.

10. The display panel according to claim 1, wherein the display region comprises pixel units arranged in an array; and wherein the display cascade scanning circuit comprises a plurality of display drive shift registers, wherein the fingerprint-identification cascade scanning circuit comprises a plurality of fingerprint-identification drive shift registers, and at least part of the plurality of display drive shift registers are alternately arranged with the plurality of fingerprint-identification drive shift registers along a column direction of the array.

11. The display panel according to claim 1, wherein the display region includes pixel units arranged in an array, and wherein the display cascade scanning circuit and the fingerprint-identification cascade scanning circuit are sequentially arranged along a column direction of the array.

12. The display panel according to claim 11, wherein the display region comprises a fingerprint identification region, and wherein the plurality of fingerprint scanning lines are in the fingerprint identification region; and wherein the fingerprint-identification cascade scanning circuit is disposed in the border region at an outer side of an boundary of the fingerprint identification region.

13. The display panel according to claim 12, wherein an oblique wiring region is disposed on one side of the border region facing towards the display region, wherein the oblique wiring region comprises a plurality of oblique wires, and wherein an included angle between an extension direction of each of the plurality of oblique wires and the column direction of the array is less than 90°; and wherein the display cascade scanning circuit is electrically connected to at least one the plurality of display scanning lines via one of the plurality of oblique wires.

14. The display panel according to claim 1, further comprising a drive chip, wherein the drive chip is electrically connected to an input terminal of the display cascade scanning circuit and an input terminal of the fingerprint-identification cascade scanning circuit.

15. The display panel according to claim 14, further comprising a plurality of fingerprint identification circuits arranged in an array, and an output terminal of each column of the array of the plurality of fingerprint identification circuits is electrically connected to the drive chip via a respective output signal line.

16. The display panel according to claim 1, wherein the fingerprint-identification cascade scanning circuit is disposed in the border region between the display cascade scanning circuit and the display region.

17. A display device, comprising a display panel, wherein the display panel comprises:
- a display region and a border region surrounding the display region, wherein the border region is provided with a display cascade scanning circuit and a fingerprint-identification cascade scanning circuit;
- wherein a plurality of display scanning lines and a plurality of fingerprint scanning lines are disposed in the display region;
- wherein the display cascade scanning circuit is electrically connected to each of the plurality of display scanning lines respectively, wherein the display cascade scanning circuit is configured to generate and output display scanning signals to the plurality of display scanning lines respectively;
- wherein the fingerprint-identification cascade scanning circuit is electrically connected to each of the plurality of fingerprint scanning lines respectively, wherein the fingerprint-identification cascade scanning circuit is configured to generate and output fingerprint scanning signals to the plurality of fingerprint scanning lines respectively;
- wherein the fingerprint-identification cascade scanning circuit comprises a first fingerprint-identification cascade scanning circuit and a second fingerprint-identification cascade scanning circuit;
- wherein the first fingerprint-identification cascade scanning circuit and the second fingerprint-identification cascade scanning circuit are disposed at two opposite sides of the display region;
- wherein the plurality of fingerprint scanning lines comprises a plurality of reset control scanning lines and a plurality of output control scanning lines;
- wherein the first fingerprint-identification cascade scanning circuit is electrically connected to the plurality of reset control scanning lines respectively, wherein the first fingerprint-identification cascade scanning circuit is configured to generate and output reset control signals for fingerprint identification to the plurality of reset control scanning lines; and
- wherein the second fingerprint-identification cascade scanning circuit is electrically connected to the plurality of output control scanning lines respectively, wherein the second fingerprint-identification cascade scanning circuit is configured to generate and output output-control signals for the fingerprint identification to the plurality of reset control scanning lines respectively.

* * * * *